(12) United States Patent
Sayed

(10) Patent No.: US 8,682,349 B2
(45) Date of Patent: Mar. 25, 2014

(54) LOCATION BASED ASYNCHRONOUS THREAD COMMUNICATIONS

(76) Inventor: Hazem I Sayed, New York, NY (US)

(*) Notice: Subject to any disclaimer, the term of this patent is extended or adjusted under 35 U.S.C. 154(b) by 152 days.

(21) Appl. No.: 13/092,954

(22) Filed: Apr. 24, 2011

(65) Prior Publication Data

US 2012/0270563 A1    Oct. 25, 2012

(51) Int. Cl.
*H04W 24/00*        (2009.01)
(52) U.S. Cl.
USPC ............... 455/456.3; 455/456.1; 709/223
(58) Field of Classification Search
USPC .................................. 455/456.3; 709/223
See application file for complete search history.

(56) References Cited

U.S. PATENT DOCUMENTS

| | | | |
|---|---|---|---|
| 7,848,765 B2 * | 12/2010 | Phillips et al. | 455/456.3 |
| 7,917,152 B2 * | 3/2011 | Alarcon et al. | 455/456.1 |
| 2008/0104227 A1 * | 5/2008 | Birnie et al. | 709/224 |
| 2010/0056183 A1 * | 3/2010 | Oh | 455/456.3 |

OTHER PUBLICATIONS

Record of Applicant's publication of the Invention on the Apple iTunes Store on Dec. 17, 2010. File Asklocal_publication.pdf.

* cited by examiner

*Primary Examiner* — Charles Shedrick
(74) *Attorney, Agent, or Firm* — Stephen E. Zweig

(57) ABSTRACT

Communication by location method that geoplaces asynchronous message threads to a specific first geographic location geo-fence within which they are visible, and a second sub geo-fence for replies. This geopinning process may be done by remote users. The message threads have a first viewing distance parameter, a second reply parameter, and other parameters. Users with mobile devices such as GPS equipped smart phones may set their devices to discover message threads that are within a specified radius of the actual device itself, or a device virtual map location, allowing very distant threads to be viewed. However only users with a real geographic proximity to the thread within the specified reply distance may reply to the thread. The method will generally be implemented by software residing on mobile devices and host servers, and may additionally use data from map servers to place the treads in a map context.

20 Claims, 27 Drawing Sheets

LOCATION BASED ASYNCHRONOUS THREAD COMMUNICATIONS

BACKGROUND OF THE INVENTION

1. Field of the Invention

This invention is in the field of location based communication, specifically as relating to geotagged asynchronous threaded conversations between multiple participants.

2. Description of the Related Art

With the advent of global positioning satellites (GPS) and smart cellular phones, exemplified by the popular iPhone and Android devices, various methods of geotagging data have become popular.

For example, Phillips et. al., in U.S. Pat. No. 7,848,765, taught a location based social network service in which users could define a geofence, pass the current location of a portable electronic device to an application server, and transmit instructions to the user to offer a service that is not offered when the user is outside of the geofence.

By contrast, Oh, in U.S. patent application 2010/0056183, taught a method and system for providing location based communication services in which access to a real time chat session between a user and a defined group of other users based on detecting when the user was within a certain proximity of a point of interest, and establishing electronic communication between the user and the group of users.

Birnie and Fortescue, in U.S. patent application 2008/0104227 taught a searching and route mapping method based on a social network, location, and time. Here GPS methods of contacting other social network members based on the location of the other social network members were taught. By contrast, Fortescue and Birnie, in U.S. Pat. No. 7,917,152 taught using GPS methods to allow social network members to request the positions of other social network members.

Yardeni et. al., in U.S. patent application 2007/0271367, also taught a system and method for location-based social web interaction and instant messaging. The system allows the various locations of instant messaging users to be plotted on a map.

In spite of these advances, and in spite of the popularity of smart phones and other devices equipped with various types of location determining means, including location by triangulation between different cell phone towers, and GPS methods, geotagged based communication methods are still not widely used. Thus further advances in the field would be desirable.

BRIEF SUMMARY OF THE INVENTION

The invention is based, in part, on the insight that there is an unmet need for what might essentially be described as an improved electronic version of a physical bulletin board. That is, there is a need for a location based electronic messaging system where casual users or strangers can post location based electronic messages in a public or semi-public forum, and receive answers from other strangers. However unlike a real bulletin board, in the invention, users are posting geotagged message threads—that is essentially a framework for an exchange of messages on a topic. Further, users may post these geotagged message threads from a distance, and read these geotagged message threads from a distance, yet require local proximity in order to join the message thread and respond to the message thread.

There are many situations in life where individuals wish to communicate with strangers, but not necessarily or even desirably in on an instant or synchronous basis. These can range from "lost dog" signs that might be posted on a neighborhood telephone pole, advertisements to sell or give away furniture that might be posted outside of an apartment house, questions about how to get access to a particular local service, local advertisements, and the like. Often individuals wish to remain anonymous for these types of postings, and often answers from other local strangers, who may otherwise be connected in any way with the poster's social network, may not come for hours, days, weeks or even longer. Such messages are asynchronous messages, because the different parties communicating do not have to be "online" or even awake or in the same location at the same time.

In contrast to isolated messages that do not require or provide a means for specifically responding to that message, messages that create a framework in which other users can then join in a reply and begin an asynchronous dialog are often referred to as "threaded" messages, because both sides (e.g. the original message, and some or all of the follow-on messages) are considered to form a continuous "thread". Often this thread presents the various communications in chronological order, with the earliest entry first. Often also multiple entries may be displayed on the same screen. The invention contemplates the desirability of geotagging such message threads, and creating certain location based rules for viewing and responding to the thread.

More specifically, the invention is also based, in part, on the insight that although prior art physical bulletin boards, post-it-notes, messages tacked to telephone poles fill a useful purpose, they have some limitations, which do not necessarily have to be transferred to a electronic bulletin board. For example, although it is impractical for a person based in New York to view a physical bulletin board that is based in Paris, such functionality might be useful. Thus for example, someone from New York intending to go to Paris, and wishing to purchase used furniture or other small item not normally advertised online, might desire to view the local Paris bulletin boards for useful items. Even better, a person based in New York might wish to advertise his or her desire to, for example, locate an apartment in a particular neighborhood in Paris, and might wish to place a local posting in advance of actually traveling to Paris. Here the poster of this thread is only interested in responses from informed sources, such as residents of a particular Paris neighborhood. Thus the poster of the thread may further create the thread with the condition that to reply, the person replying must be within a certain close geographical proximity to the Paris geolocation of the thread.

This invention is based, in part, on a recognition that it is desirable to place geographical restrictions on the asynchronous and threaded communications between strangers in certain situations, but these restrictions do not need to be uniformly symmetrical. In particular it may be desirable to place more geographical restrictions on replying to a thread than the geographical restrictions on creating a thread and viewing a thread.

Thus in one embodiment, the invention may be a communication by location method. The method will typically work with a mobile computerized device, often a smart phone or wireless tablet, which will typically be equipped with at least one computer processor (microprocessor), memory, user interface, display screen, bidirectional wireless communication link capability, and location determination capability such as a GPS receiver, or at least an ability to have its location triangulated using various cell phone towers, Wi-Fi router identification, or alternate method.

In operation, the invention will create at least one communication thread, typically an asynchronous communication thread, on a database associated with a host internet server or other type application server. Each of these communication threads will typically comprise at least an initial entry (e.g. a heading such as "lost dog"), and at least one set of geographical identification metadata that has at least the communication thread geolocation (i.e. the location where the user wishes to post the message), a communication thread category (e.g. event, housing, marketplace, miscellaneous, place, question, service thought, work, etc.), a first communication thread viewing geographical zone (i.e. how far away from the thread geolocation can the message thread be seen), and a second communication thread reply geographical zone (i.e. how close do you have to physically be to the location of the message to post a reply). This second reply geographical zone will encompasses at least the geolocation of that communication thread, and this second reply geographical zone will be encompassed within the first viewing geographical zone.

Although these various zones do not have to be circular, in the embodiments where they are circular, the net effect is not unlike a bull's eye, where the center of the bull's eye is the thread location, the first ring is the reply zone, and the largest ring is the viewing zone. Usually the diameter of rings (or to generalize, the shape and size of the zone) will be user adjustable by the creator of the thread, who usually will also post the first message. Note that the geographical location of the original thread posting does not necessarily have to be at the thread creator's user's present location, although it may be. Rather, a thread creator may decide to geolocate (i.e. "pin") a thread to a remote location. In some embodiments, the thread creator will be given a unique privilege, not available to other thread users, of being able to view and post to his or her thread from any location.

To see the message, a second user will use the invention, often in the form of application software (e.g. an "app) running on a suitable computerized mobile device. The second user will often set a map viewing location on his or her mobile device, where this map viewing location may either correspond to the second user's actual physical location, or alternatively may be the user's virtual location that corresponds to the location where the user believes communication threads of interest may be located. The second user may further set a maximum communication thread viewing radius or zone about this map viewing location.

Although this maximum communication thread viewing radius or zone will not enable users (other than the thread creator, who may have a distant viewing privilege) to see threads that have first communication thread viewing geographical zones that too far away from the user's present physical location, the user map viewing location and maximum communication thread viewing radius or zone about this map viewing location act to further filter the results so that the user and the system is not having to handle too many threads from areas that are not of interest to the user.

Thus for example, as per our previous example, a New York located user, after creating a message thread "pinned" or geolocated on Paris asking local Paris residents about local items of interest, may then virtually return (i.e. move his or her map location to Paris), and view this Paris geolocated thread for responses from locals. To do this, the user may set the viewing radius (e.g. the first communication thread viewing zone) of the thread to be quite large, even thousands of miles, but the user will set the reply radius (e.g. the second communication thread reply geographical zone) of the Paris thread to a very small local radius, so that only local Paris users may post replies.

The user (by way of the invention's software application running on the user's mobile device, and the invention's host server software) can then use the mobile device to establish a communications link with the host internet server, transmit the user's present location and map viewing location of his or her mobile device to the host internet server, and also transmit at least a maximum communication thread viewing radius and one or more communication thread categories (e.g. a request to show the user some or all of the various event, housing, marketplace, and so on categories) to the host internet server.

The host internet server can then use the present location and map viewing location of the mobile device, communication thread categories, and maximum communication thread viewing radius as a search key to a thread database, and search for communication threads with communication thread geolocations, communication thread categories, and communication thread viewing zones that are also within the maximum viewing radius of the map viewing location of the mobile device. These results can be used at least as a first search criteria to determine if at least the selected communication thread geolocations of the search selected communication threads should be transmitted to the user's mobile device, and if so, transmit these selected thread geolocations. In other words, if each relevant thread can be considered to be a pin on a map, this step essentially transmits the location of the various selected "pins" to the user.

Users may then obtain further information about the various geolocated threads, titles subject matter, contents and the like, view them on maps and lists, view the various postings, and respond to the various postings as appropriate.

The invention was originally submitted to the Apple App store on Dec. 10, 2010, and was subsequently made available to the public (published) on the Apple App store on Dec. 17, 2010.

DETAILED DESCRIPTION OF THE INVENTION

Figure 1:
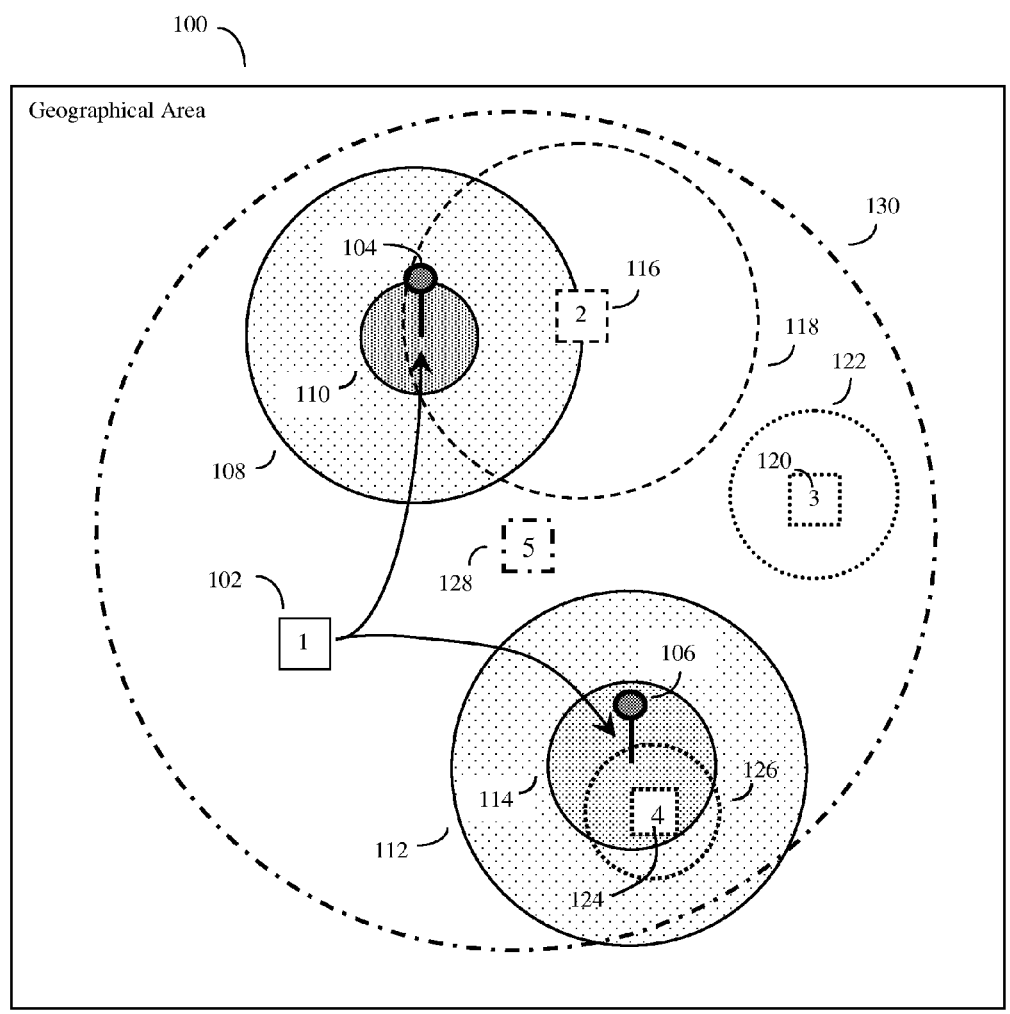
FIG. 1 gives an overview of how various communication threads with different geolocations, viewing zones and reply zones may differentially seen and utilized by various users depending upon the geolocations and the maximum communication thread viewing radius of the various user mobile devices. Here the various map viewing locations correspond to the actual physical locations of the various users.

FIG. 1 gives an overview of how various communication threads with different geolocations, viewing zones and reply zones may be differentially seen and utilized by various users depending upon the geolocations and the maximum communication thread viewing radius of the various user mobile devices. As previously discussed, these mobile devices will generally be smart phones, tablets, laptop computers, and the like, exemplified by the popular iPhone and Android devices, that will typically be equipped with at least one processor, memory, user interface, display screen, bidirectional wireless communication link capability, and location determination capability.

This example shows various mobile device equipped users interacting with various geolocated communication threads within a geographical area (100). This geographical area is of arbitrary size, and may be as large as all of planet earth, or be as small as various locations within a single building, but in any event the position of the various objects within the geographical area (100) is intended to represent their relative geographic positioning in terms of, for example, latitude and longitude. In FIG. 1, assume that all users have set their map viewing location to correspond to their present actual location. The case where a user's map viewing location is different from a user's present actual location will be discussed subsequently in FIG. 3.

In this example, user 1 (102) has posted two different asynchronous communication threads to two different geolocations (104) and (106). Note that according to the invention, the user does not have to be physically present in a particular location in order to geolocate a thread to that location.

The geolocation of each asynchronous communication thread (which will often be abbreviated here as "communication thread" or even simply "thread") is represented by a symbol of a push pin, where the base of the pin represents the precise geolocation of the thread, and the head of the pin is provided in order to make the pin more conspicuous and/or also help distinguish between different threads (e.g. using different colors, different shapes, and so on).

Note that in this example, the two threads (104), (106) created by user (102) may represent totally different subjects and, except for the fact that they were created by the same user operating from the same real geographical location (102) may otherwise have nothing in common with each other. In an alternative embodiment, the system can be configured so that the same user can send the same message to multiple locations at the same time. This later option can be useful when, for example, there is a need to send the same message to multiple related sites. Thus a chain store worker, for example, can pin the same type of message to multiple chain store locations. Keep in mind however, that as a general rule, the vast majority of the various threads are expected to be posted on a non-duplicated basis.

Each thread will typically comprise or contain at least an initial entry (usually the thread originator's or owner's first post), geographical identification metadata such as the communication thread geolocation, a communication thread category, a first communication thread viewing geographical zone, and a second communication thread reply geographical zone. Some of the categories that a communication thread may be assigned to include categories such as event, housing, marketplace, miscellaneous, place, question, service, thought, work or other categories.

In some embodiments of the invention, the thread owner or originator may also specify additional properties of the thread. Here some of these choices may include: 1: only the original poster can view all replies regardless of his or her physical location, 2: in addition to the original poster, people located within the reply distance can see replies, or 3: additionally, people located within the viewing distance may also see replies. In principle all permutations are possible; however certain preferred options will be discussed in more detail.

Thus, for example, when the user 1 set up thread (104), the user established a first viewing geographical zone (108) and a second reply geographical zone (110). Similarly when the user 1 set up thread (106), the user established a first viewing geographical zone (112) and a second reply geographical zone (114) for that thread as well. The various zone sizes can be different for each thread, however the second reply geographical zone (e.g. 110, 114) encompasses at least the geolocation of the communication thread (e.g. 104, 106), and the second reply geographical zone (e.g. 110, 114) is encompassed within the first viewing geographical zone (e.g. 108, 112). Although the zones are drawn here as circular zones with a radius centered at the geographic location of the thread(s) (104), (106), in fact the zones can be other shapes, such as regular polygons or even irregular shapes, as long as the basic rule: thread geolocation is inside of the reply zone, which is inside of the viewing zone, is maintained.

Figure 3:
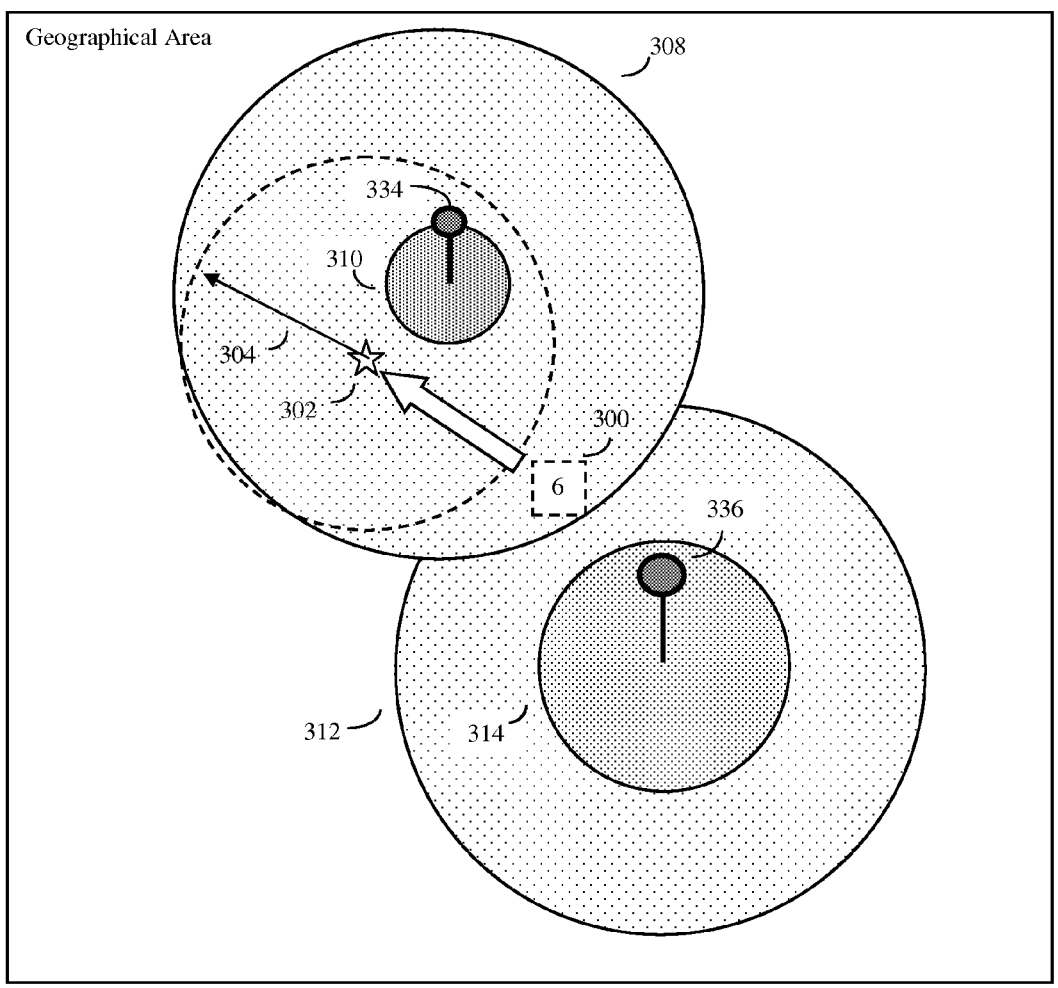
FIG. 3 shows an example of a map viewing location that is displaced from the actual physical location of the user.

Once posted, various other users 2, 3, 4, and 5 can use their devices to attempt to view or interact with the various threads. Here for example, user 2 (116) who has set a maximum communication thread viewing radius (118) on his device as shown, will be able see or detect communication thread (104), because user 2 is both physically located within the viewing zone of (108) of communication thread (104), (or at least right on the boundary of viewing zone (108)), and is also informed the system, by setting his or her virtual map location to this region, that he is interested in receiving (FIG. 3 and associated discussion). However user 2 is not close enough to communication thread (104) to make a reply to communication thread (104) because user 2 is physically located outside of reply zone (110), and the creator of the posts (user 1) has set the criteria that in order to reply, the user must be physically located (not virtually located) close to the posts. User 2 is also too far away from communication thread (106) to either view communication thread (106) or post to it.

By contrast, user 3 (120), who is outside of the view communication zones of threads (104) and thread (106), and who has not created thread (104) or (106), cannot see or interact either thread, irrespective of where he sets his virtual location, or how he sets his maximum communication thread viewing radius (122).

On the other hand, user 4 (124), who has set a fairly small maximum communication thread viewing radius (126), is able to see thread (106) and reply to thread (106) because user 4 is physically located inside thread (106)'s first communication thread viewing geographical zone (112), inside of thread (106)'s second communication thread reply geographical zone (114), and also has specified by user 4's virtual location and how he sets his maximum communication thread viewing radius that he is interested in interacting with threads in this region.

Finally user 5 (128), who also did not create threads (104) and (106), and who has set a very wide maximum communication thread viewing radius (130), is still unable able to view or post to ether threads (104) and (106), even though he has told the host server that he is interested in receiving information about threads from these regions, because user 5 is physically too far away from their viewing zones and reply zones.

As previously discussed, in at least some embodiments of the invention, there may be no geographical posting or reply restrictions on at least the owner or originator of a communication thread. Thus in this example, as previously discussed, user 1 (102) is able to create communication threads (104) and (106) from a considerable distance away, in fact from outside of the first viewing geographical zones (108), (112) of either thread. In other embodiments of the invention, however the owner of a post may have certain geographic thread creation restrictions applied. The exact rules will be a determined by a matter of system (e.g. host server) policy and thread creator preferences.

The lack of geographic restrictions on at least the originator of a communications thread has some useful advantages. Thus, for example, an individual planning to travel from New York to Paris may create a local Paris posting while still in New York. However it is anticipated that frequently users will choose to set the geolocation of the communication's thread at their present location at the time of posting.

Figure 2:
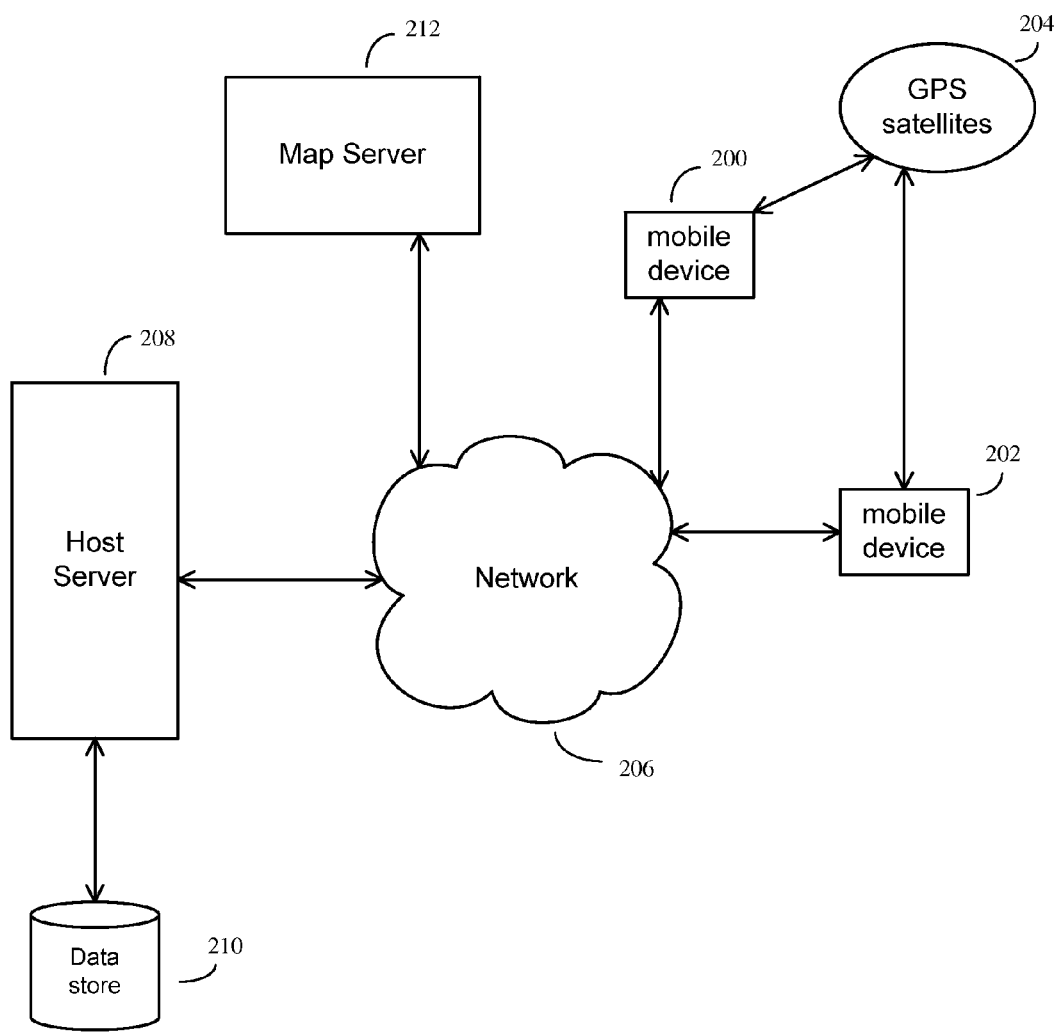
FIG. 2 shows an outline of how the major components of the system interact.

In order to accomplish this functionality, the system makes use of various types of communications equipment, and servers. FIG. 2 shows an outline of how the major components of the system interact.

Here the various mobile devices (200), (202), corresponding to the mobile devices used by users 1-5 in the previous figure, will often establish their geolocation through use of various location determination devices, such as GPS satellites (204), or alternatively by alternate location determination methods such as cell phone tower triangulation, Wi-Fi router identification, and so on (not shown). The mobile devices will in turn communicate through a network such as the Internet (206), often by an intermediate cellular wireless connection to various cell phone towers (not shown), or alternatively through local Wi-Fi links to the Internet (not shown).

Using the network (206), the various mobile devices will generally interact and exchange data relating to the various communication threads by way of host server (host application server, host internet server) (208). This data will generally be stored and managed on one or more databases (210) connected to host server (208). Additionally, although not an essential part of the invention, the system will often find it convenient to obtain supplemental geographical map information (e.g. locations of streets, buildings, optionally overhead photos of the area, and the like) from a map server (212), which may be a third party map server such as a Google map server or other type map server.

In contrast to FIG. 1, where the map viewing locations of all the users was set to correspond to the user's present physical location, in normal use, the map viewing location, which again may be viewed as a filter on the various threads that the user wishes to receive, may often be set by the user to be different from the user's present physical location. This can be done simply by, for example, allowing the user to scroll his or her virtual location on a map, using a touch sensitive screen on the user's mobile device.

An example of this virtual location filtering method in action is shown in FIG. 3. In FIG. 3, user 6 (300) has set his or her map viewing location (302) (the star) and maximum communication thread viewing radius (304) to a location that is displaced from the present location of user 6 (300). This displaced map viewing location and maximum communication thread viewing radius (302), (304) encompasses the first communication thread viewing geographical zone of communications thread (334). However the user's viewing location (302) and maximum communication thread viewing radius (304) is outside of the first communication thread viewing geographical zone (312) (and reply zone 314) of communications thread (336).

Thus in this example, user 6 (300) has set his map viewing location and maximum communication thread viewing radius in such a way as to filter out any data from thread (336).

To prevent server overload, as well as data congestion on the wireless link, the host server (212) will often use this filter to determine that it need not send data from thread (336) to user 6 (300).

Note that in this example, user 6 (300) is still too far away from thread (334) to post a reply, because the user is still outside of the reply geographical zone (310) for thread 334.

In other embodiments, the thread privileges may be set up so that the second reply geographical zone (110) may also be filtered relative to the user's "virtual" map viewing location (302), rather than the user's actual physical location (300).

Thus in use, a user of the mobile device will typically set a map viewing location (302) on his or her mobile device. As previously discussed, this map viewing location will often correspond to the location where communication threads of interest may be located, and often will be set to the user's actual physical location, but this is not required. Thus the map location may be set to a location other than the current location of the user's device. In some embodiments, the device software may provide a means, such as a touch sensitive homing button, to cause the map viewing location (302) to return to the user's present physical location (300. Often also, the map viewing location upon application software startup will default to the user's present physical location.

The user will further set (or else accept system defaults for) a maximum communication thread viewing radius (304) about this map viewing location (302). The user will then use his or her mobile device (300), (200) to establish a communications link with the host internet server (208), and the device and software will transmit the user's present location (300) and the user's map viewing location (302) of the user's mobile device to this host server (208). Typically this communications session will also transmit at least the user's maximum communication thread viewing radius (304) and one or more communication thread categories to the host internet server (208).

Once this data has been transmitted to the host server (208), the host server will use this data, such as the present location (300) and map viewing location (302) of the user's mobile device (300), the user selected communication thread categories, and the user selected maximum communication thread viewing radius (304) as a search key to search database or data store (210) to search for communication threads (e.g. 104, 106) with communication thread geolocations, communication thread categories, and communication thread viewing zones (e.g. 108, 112) that are within the maximum viewing radius (304) of the map viewing location (302) of the mobile device (300). In this example, assuming that the categories will match, a search of database (210) using user (300) search keys will return thread (104) but not thread (106), since thread (106) is outside of the present viewing zone for device (300).

The results of this search can be used as at least a first search criterion to determine if at least the selected communication thread geolocations of the search selected communication threads should be transmitted to the mobile device. Assuming that any other search criteria are also met, the results, such as at least the geolocations of the threads matching the various search criteria will be returned from database (210) by way of host server (208) and network (206) to the user device (200), (300) as thread data. Often the search will return more than this, such as, for example, the tile of the thread, thread category, a thread icon, and so on.

Once this basic thread data is returned, the user's device can display this thread data in various ways. One way is to graphically show the geolocations of the various threads on a map, annotated with icons or short descriptions or various informative graphical elements as desired. This method is particularly useful for devices with touch sensitive displays, because here a user can merely touch a pin or other icon showing a thread of interest, and find out more about the thread.

Alternatively or additionally, it is also useful to show the thread data as a list of message threads, often sorted by various criteria such as distance from the user's present real location (300), distance from the user's map viewing location (302), age of post, or other criteria. A user may then scroll through the list, and pick threads of interest for further viewing. Often both map displays and list displays may be used, and the user may switch back and forth or alternatively see both side by side as desired.

Map Oriented Methods:

For map oriented methods of interacting with the various threads, as before, the user mobile device may often supplement the thread geolocation data by establishing a communication link (206) with a map server (212) and downloading map information pertaining to the geographic region of interest. To do this, the mobile device may transmit the map viewing location (302) of the mobile device, and usually the maximum communication thread viewing radius (304) or similar geographic extent data to the map server (212), and receive back from the map server selected map information pertaining to a geographical map within the maximum communication thread viewing radius of the mobile device. Thus for example, again referring to FIG. 3, user 6 (300) may end up seeing a map of the area within the dashed line radius (304) on his or her mobile device. This map will usually show at least portions of the geographical map of the area around dashed line (304).

Not all map data needs to be displayed by the user's device. Different levels of detail may be chosen, only road map data may be shown, only map image data (i.e. satellite photos of the area) may be shown, and so on. The user's device will often also overlay the map data with icons representing the geolocations of the search selected communication threads. That is, if the database (210) and host server (208) returned the geolocation of message thread (334), often it will be useful to show this on the user's display superimposed on a map of the area. Here icons such as push pins or other icons are useful for showing this, but of course nearly any graphical display method will work here. In a preferred embodiment, the icons or other message showing the location of the message threads, such as (334) will be made touch-sensitive or clickable so that a user can touch or click on a thread of interest to find out more about it (i.e. make further inquires).

In some embodiments, it will be useful if the host server (208) additionally transmits additional information, such as the category of the search selected communication threads, headings or titles, icons, and so on. If this is done, then the user's mobile device can show a different graphical image according to the category of the various threads. Here, as previously discussed, methods such as color coded icons, icons resembling their subject matter, and of course text based icons (or just text) may be used.

List Based Methods

As previously discussed, in other embodiments, a list based approach for interacting with the various message threads may be useful. Here, for example, the host server (208) may additionally transmit the category, title, and/or icon of the search selected communication threads to the mobile device. The mobile device may then display this information on a list view, where for example, the list may contain the search selected communication thread geolocations (e.g. 334, categories, title and/or icon, as well as the distance between the search selected communication thread geolocations and the map viewing location (302) of the mobile device.

In addition to just returning headings, icons, titles, and the like, at least upon subsequent inquiries from the mobile device, the system will also transmit a more complete record of the thread, such as the various other replies and data submitted by various users after the thread was established. Here how much of this subsequent thread data (e.g. subsequent replies and data) will often depend on the privileges of the user of the mobile device making the inquiry, as well as available bandwidth and data amount considerations.

In many embodiments, either when the communication thread is initially established, or subsequently (potentially even on a per-post basis), the entries in any given communications thread of interest can be further annotated with viewing privilege criteria. These viewing privilege criteria may vary according to the privileges of the user of that particular mobile device, and these privileges will control what data is transmitted and/or subsequently displayed by that mobile device.

These privileges can, for example, include privileges such as the communications thread owner privilege (often the creator of a particular thread may get higher privileges, in effect becoming the system administrator for that particular thread), public privilege (e.g. privileges of general members of the public who have not posted on the thread before), previous poster privilege (here the owner of a particular post may have privileges at least to edit or delete his or her own post), group privilege (e.g. some groups, such as members of a club or company, may collectively have higher privileges), fee-based privilege (self explanatory), and other privileges.

As previously discussed, in some preferred embodiments of the invention, it is useful to restrict subsequent users from submitting additional posts on the thread by according to the user's actual (physical) geographical location. Here, for example the host internet server (208) may, along with other data, send the mobile device information pertaining to the reply geographic zone (e.g. of 110) of a selected communication thread (such as 104) a mobile device. The mobile device software and host server software then may, for example, determine that if the present real (physical) location of said mobile device is within the reply geographic zone (110) of the selected communication thread (104). If so the software may allow a new (subsequent) entry to this selected communication thread (104) to be transmitted from the mobile device to the host internet server (208), linked or added to the selected communication thread (104), and stored on the database (210).

In this scheme, for example, if the system is set up to enforce that a user device must be within real geographic proximity of a reply geographic zone (110), (114), then device 4 (124) from FIG. 1 would have reply privileges to thread (106), but at least devices 2, 3, and 5 would not have reply privileges to either thread (104) or (106). Alternatively if the system is set up to allow the thread originator to view and post from anywhere, then device 1 (102) in FIG. 1, belonging to the originator of threads (104) and (106), can both view and post to these threads from his or her current location (102), even though it is far away from either thread.

Although often the posts on a thread (either the original post, or subsequent posts) may be text based, in principle any type of data may be included in a particular post. Thus for example, original or subsequent entries can include text, images, audio, video, URL links, binary program files, and other types of data.

EXAMPLES

Figure 4:
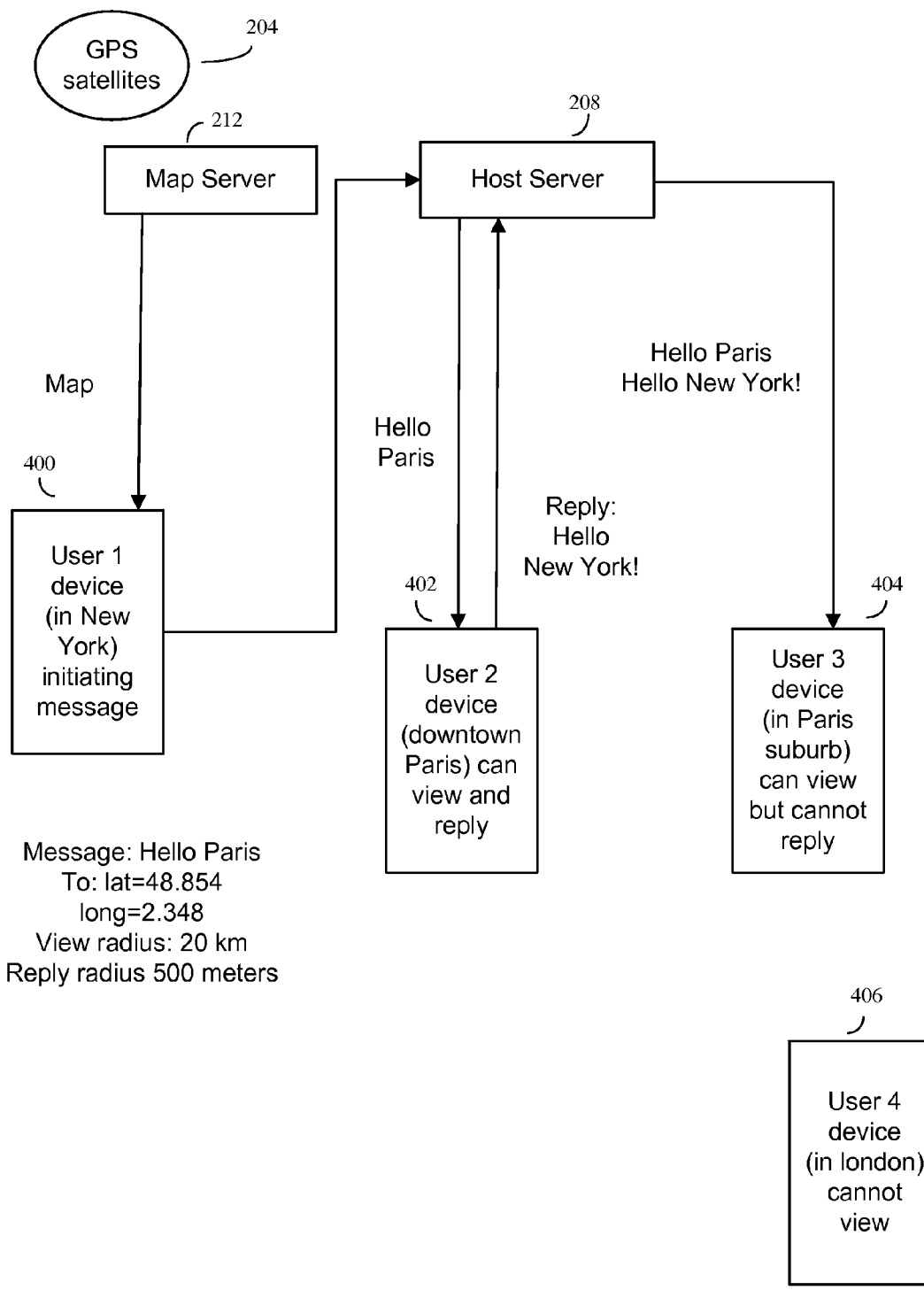
FIG. 4 gives an example of message flow between users in New York, London, a Paris suburb, and downtown Paris.

FIG. 4 gives an example of a hypothetical message flow between users in New York, downtown Paris, a Paris suburb, and London. Here user 1 (400) who is located in New York may initiate a thread by first moving his virtual map viewing location to Paris by scrolling on his the map display on his device, or other method. Here, the displayed may be based on map data obtained from the map server (212) as previously described, while the actual thread message will be posted on the host server (208).

In this example, as a result of the thread creation event, the system has automatically stored a downtown Paris latitude and longitude of the geolocation of the thread on the server (208). Here the user has specified that the message may be seen from a viewing radius of 20 kilometers from the downtown Paris location, but only users physically located within 500 meters of the geolocation may reply. As a result, with these settings, a second user (402) using a device from a downtown Paris location may view and reply to this message thread. However a third user (404), even though nearby (here a Paris suburb) may read the message thread but may not reply. A fourth user (406), located in London, cannot view the message or reply to the message.

Figure 5:
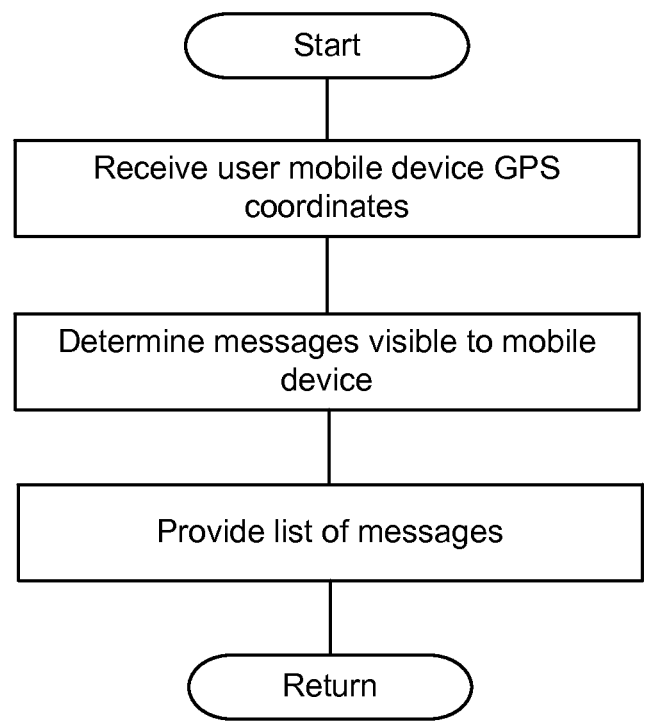
FIG. 5 gives an example of some of the host data flow steps.

FIG. 5 gives a high-level overview example of some of the host server data flow steps. Here host server (208) will generally receive the mobile GPS coordinates (or other location data), determine what messages will be visible to the mobile device using the previously described considerations, and then provide the list of messages.

Figure 6:
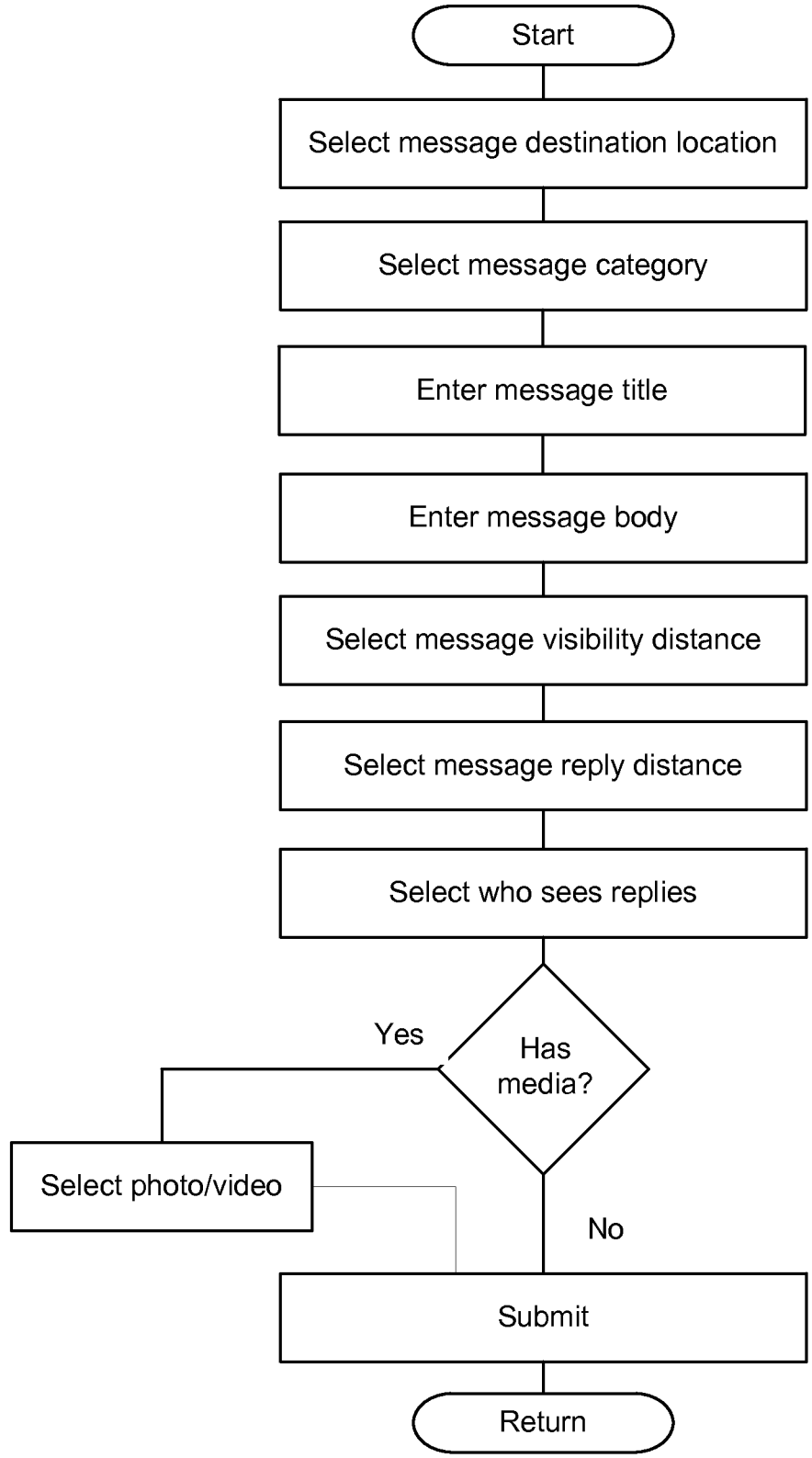
FIG. 6 shows some of the steps involved in using a device to post a new single location message.

FIG. 6 shows some of the steps involved in using a device to post a new single location message. Here a user will generally select a message destination location and category, enter in a message title and body, and also select the first communication thread viewing geographical zone (i.e. message visibility distance). The user will also select the second communication thread reply geographical zone (i.e. the message reply distance), select user privileges (i.e. who can see the replies), and optionally if there is additional media such as photos or videos and the like, submit the data to the host server (208).

Figure 7:
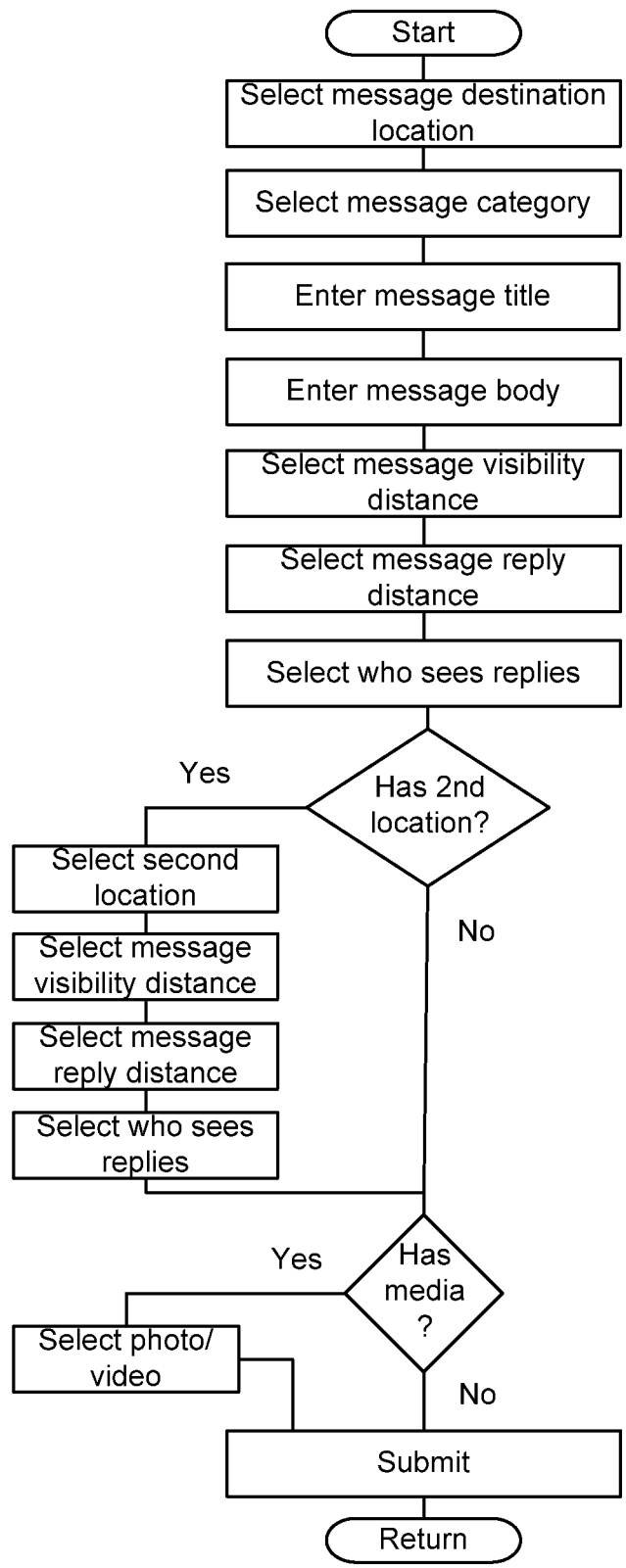
FIG. 7 shows some of the steps in hosting a new multi-location message.

FIG. 7 shows an example where a user may wish to post to multiple locations in the same session. Here the first part of the process is much as previously described for FIG. 6, but additionally the user is now given the option to select a second location, and also set the parameters for this location as well.

Figure 8:
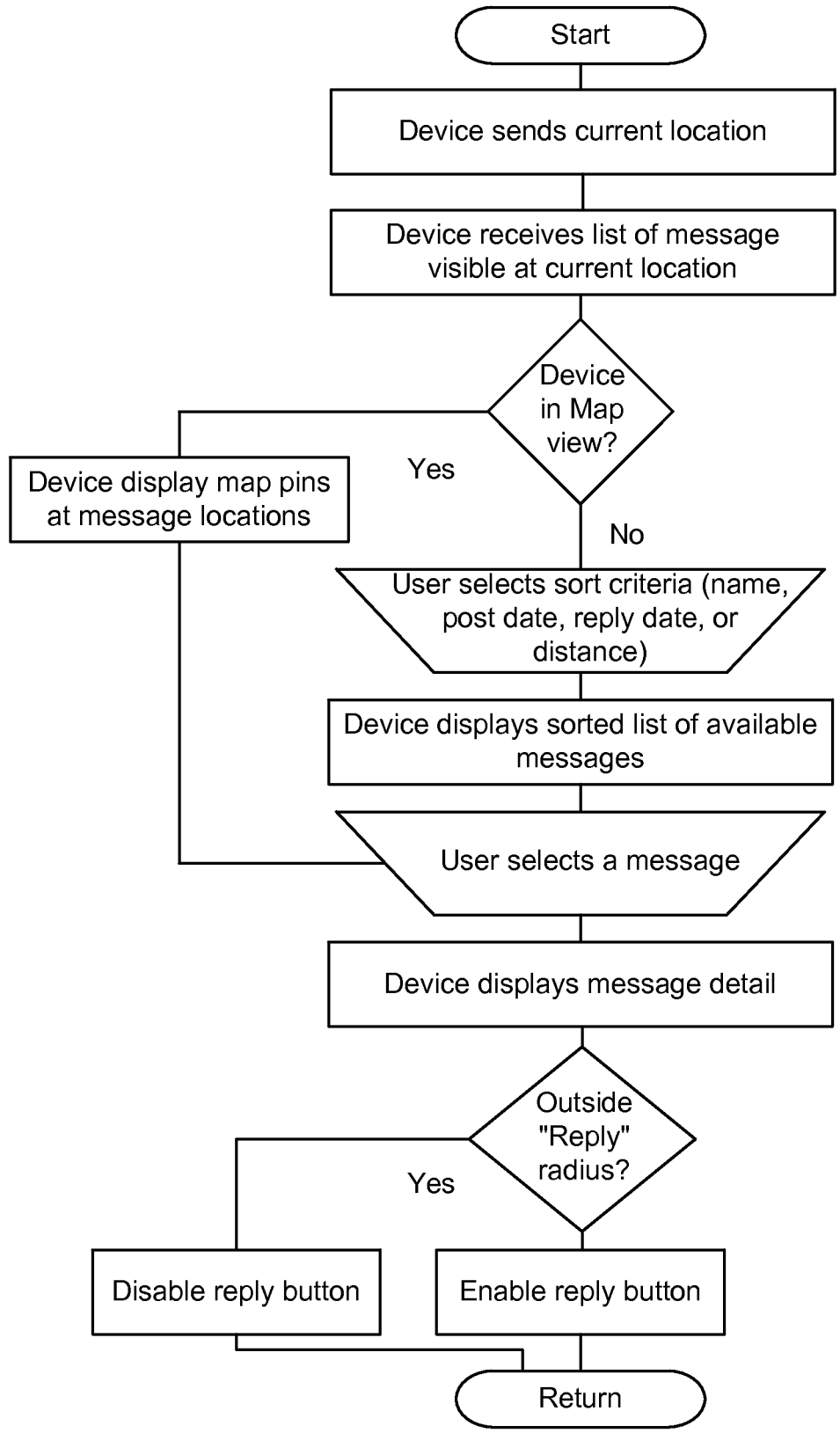
FIG. 8 shows some of the steps involved in viewing variable message detail on a device.

FIG. 8 shows the process of viewing a message thread on a device. Here the user's mobile device will send its current location to host server (208), and receive a list of message threads that are visible at the user's current location and settings, as previously described. If the user is operating his or her mobile device in a mapping mode, then in some embodiments, the device will download map data from a map server (212) and display the message threads (often using pin icons or equivalent) arranged on the map according to the geolocation of the various threads. If the user is operating his or her mobile device in a list view, then the device will often show a list of the selected message threads, which can be sorted depending on user criteria.

In either event, the user will pick a message thread of interest, either by map location or list selection, often by pressing on a touch sensitive display, or by using an equivalent method such as a mouse click. When this happens, the device may show additional details regarding the message, such as the initial posting and (where the user privileges are adequate) subsequent replies as well. If the user is outside the reply radius (i.e. outside of the second reply geographical zone for that message thread), then the device will disable the reply button (for those systems where the user is not given the ability to reply to that message thread). If the user is within the second reply geographical zone (reply radius), then the reply button will be enabled (along with other reply functionality) and the user will be allowed to append his or her reply to that particular message thread.

Figure 9:
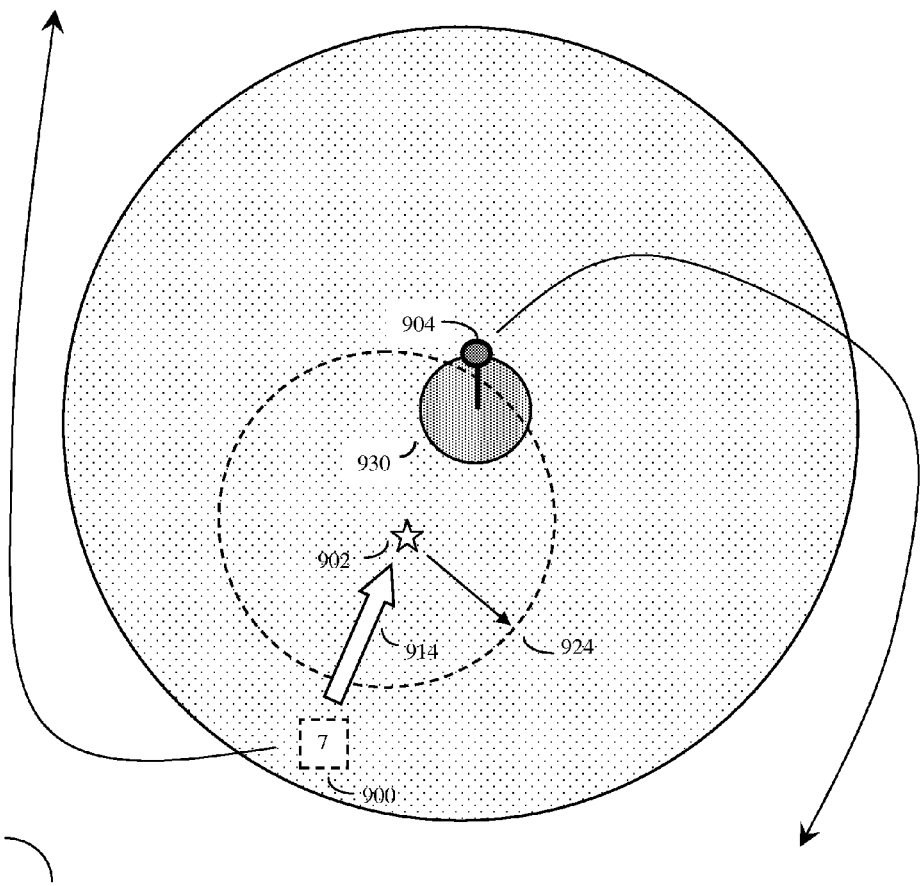
FIG. 9 gives an example of the data structure of a message thread.

FIG. 9 gives an example of the data structure of a message thread, and an example of the type of search algorithm that goes on inside of the host server. In FIG. 9, assume that a user with mobile device 7 (900) is physically located at latitude 0°, longitude 0°, but has a virtual map viewing location (902) that is displaced or set (914) to latitude 1°, longitude 1°, and the thread of interest (904) is geolocated at latitude 2°, longitude 2°. Assume that in the host server database (210), thread (904) was initially set up by the thread originator, with user ID 12345, to be in the miscellaneous category, to have a viewing radius (e.g. first communication thread viewing zone) of about 2.5 degrees (172 miles), and have a reply radius (e.g. a second communication thread reply zone) of about ⅓ degree (23 miles).

Assume further that the system will require that the user device be within the reply radius to post replies to the thread (tie to physical location yes). Assume further that the original poster gave the thread the heading "Example", an icon of a "pin", and that the database will then link to the original post and various subsequent messages on this thread (link, details not shown). The database (210) for this thread, in the context of other threads, can be seen in (906)

Then when user on device 7 (900) communicates with the host server (208) and database (210), the user's mobile device 7 will transmit the device identifier (7), the physical latitude of the device (0°), the physical longitude of the device)(0°), the virtual map latitude of the device)(1°), and the virtual map longitude of the device)(1°), the thread category desired to view (here Misc.) and the device viewing radius (here about 1 degree or 69 miles). An example of this transmitted mobile device data can also be seen (908).

The server will receive this data (908), compare it with the various threads in the database (906), and will calculate if the device physical latitude and device physical longitude places the device within the 172 mile reply radius of thread 904 (assuming 69 miles per degree of latitude and longitude in this example). It will find that device is close enough to see the post using the physical proximity test. The server may also check the User ID (here 32014) versus the thread creator ID (here 12345), and if creator privileges are present, skip this physical proximity test, but in this case the user is not the creator, so the physical proximity test is in effect. (Note that other types of privileges, such as public privilege, previous poster privilege, group privilege, fee-based privilege, and other privileges may be used to modify or skip the physical proximity test according to the system administrator policies then in effect.)

Next the server will check to see if thread (904) is also within the filter imposed by the user's map viewing location (922) and maximum communication thread viewing radius (924). If it is within these criteria as well, then the host server will report data from thread (904) to user 7 (900). Otherwise this thread data will be excluded since user 7 has indicated, through choice of map viewing location and maximum communication thread viewing radius, that he or she is not interested in threads from this location.

In this example, thread (904) satisfies both criteria. The user is within the first communication thread viewing zone, and thread (904) is within the user selected map viewing location and maximum map communication thread viewing radius. The host server will send the thread data to the user's device, and the user's device will display this data. However as can be seen, user 7 is not close enough to post to thread (904) because user 7 is outside of the tread (904) second communication thread reply zone (930).

Examples of an implementation of the system in operation.

As previously discussed, an embodiment of the invention, termed the "AskLocal" app was published on the Apple App store on Dec. 17, 2010. As a result, numerous users had a chance to download the application and experiment with it. The following figures show screenshots that were taken on Apr. 9, 2011, in Northern California, using a Verizon iPhone 4 Smartphone, and with the exception of the identified replies and postings, the various message threads represent message threads left by other uses of the system.

Figure 10:
FIG. 10 shows some of the AskLocal settings

FIG. 10 shows some of the AskLocal message thread settings. Here the system has been set with a first communication thread viewing zone of 13.9 miles, using a software slider (1000).

Figure 11:
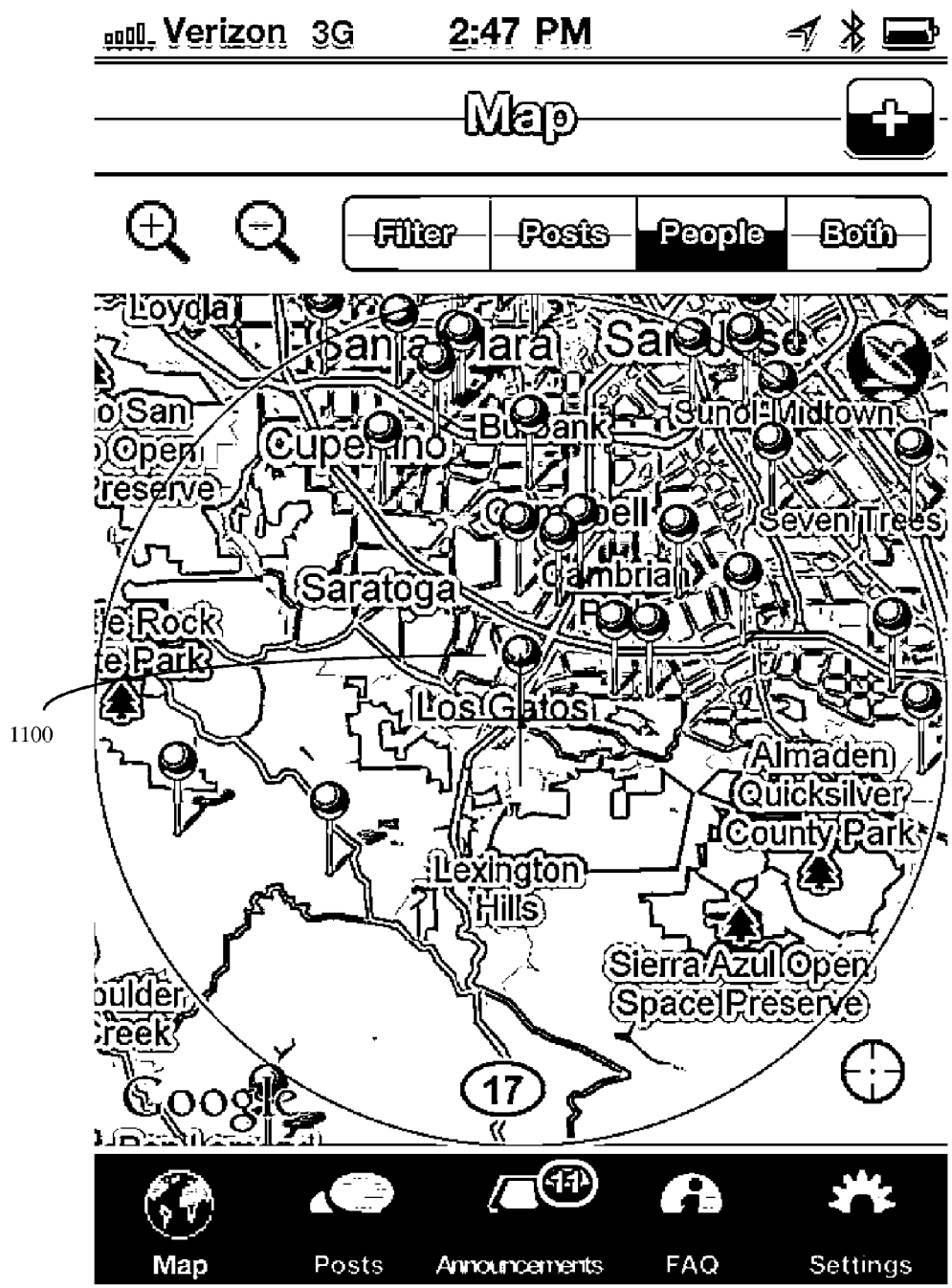
FIG. 11 shows a long range (approximately 13.9 mile radius) view of a community showing locations of recent AskLocal users. The present user has used the set location circle to center the display in the user's current location in Los Gatos.

In FIG. 11, the AskLocal app software has been set to map view, and has been instructed to return the location of the various local AskLocal users (who have authorized release of this data), regardless of if they have posted message threads or not. This map shows a long range (approximately 13.9 mile radius) view. The present user has used the set location circle to center the display in the user's current location in Los Gatos (1100).

Figure 12:
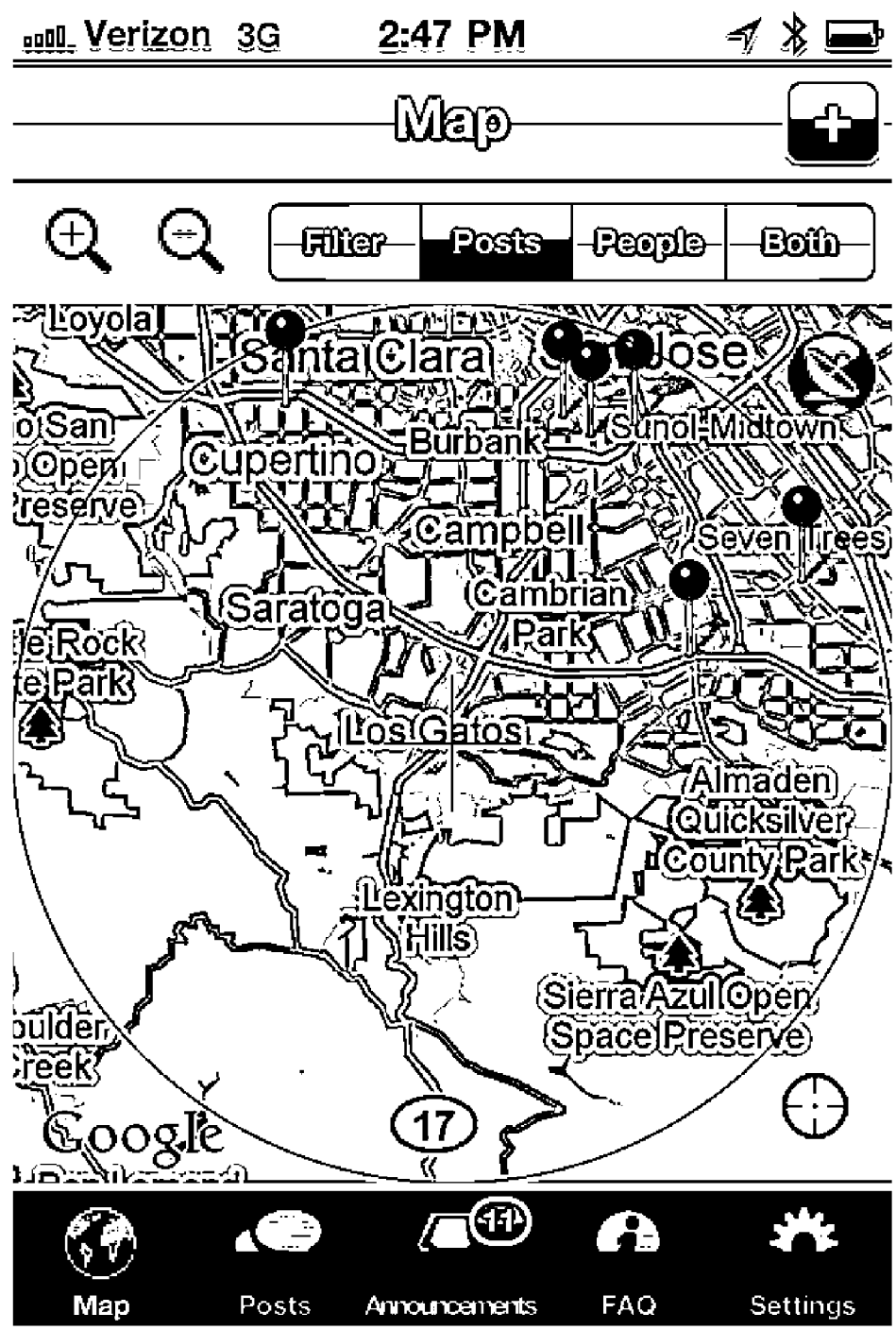
FIG. 12 shows the location of the various long distance thread posts that can be seen from the user's present location in Los Gatos.
Figure 13:
FIG. 13 shows a list of some of the various thread posts that can be seen from the user's present location in Los Gatos when the radius is reduced to 11.4 miles.

In FIG. 12, the AskLocal app software has been instructed to only show the geolocation of the various communication threads within 13.9 miles of the user's location, which is still set to coincide with the user's actual location in Los Gatos. Because the user in Los Gatos has not posted a message in Los Gatos, there is no pin at the user's present location.

To get more insight into the content of the various communication threads, the user next switches the AskLocal software to list view, and also reduces the extent of the first communication thread viewing zone from 13.9 miles down to 11.4 miles, here by adjusting a software slider. Various messages, many advertisements of some sort, along with brief captions and icons can be seen in this list view. Assume here that the user is particularly interested in the Hacker Dojo message thread (1300), and thus selects the Hacker Dojo message thread for further information.

Figure 14:
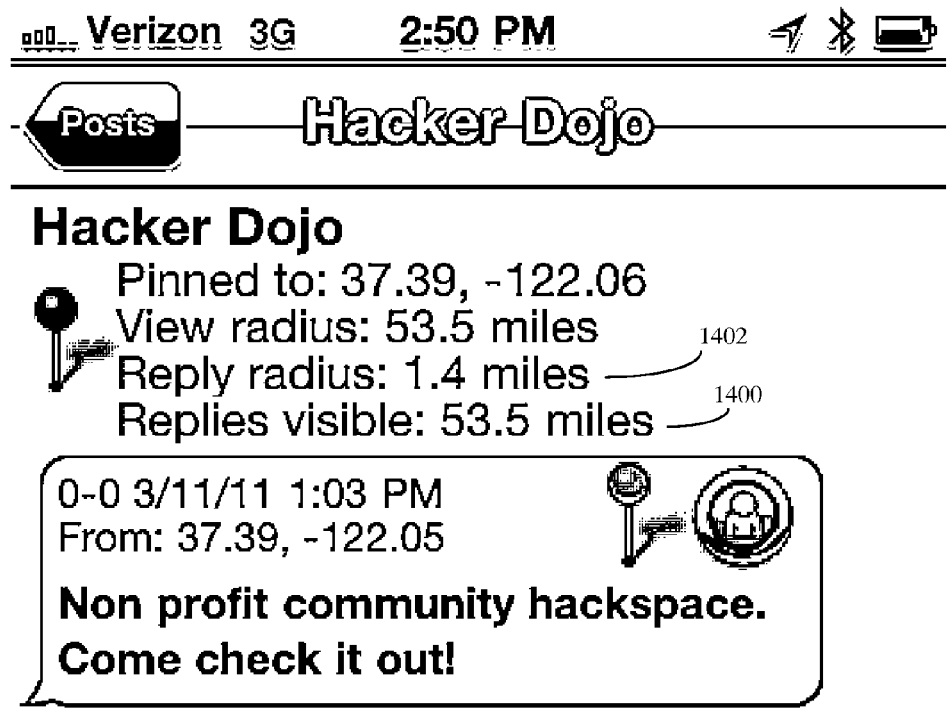
FIG. 14 shows more detail from the Hacker Dojo thread posting of interest.
Figure 14:

FIG. 14 shows more detail from the Hacker Dojo posting of interest. Here the person who initiated this communications thread set the view radius to 53.5 miles (1400), which is why the user, who had set his viewing zone to 11.4 miles, and who is only about 10 or so miles away, can see this post. Note however that the person who initiated the thread set the reply radius to only 1.4 miles (1402). Thus the present user is too far away to reply to this post. The post contains an invitation to check out the place.

Figure 15:
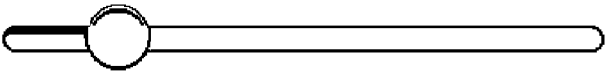
FIG. 15 shows a list of some of the various thread posts that can be seen from the user's present location in Los Gatos when the radius is further reduced to 8.2 miles. The Hacker Dojo thread post of interest has disappeared because it is more than 8.2 miles away.

FIG. 15 shows what happens if the user further narrows the first communication thread viewing geographical zone down from 11.4 miles to 8.2 miles. Because the user is more than 8.2 miles away from the Hacker Dojo, the Hacker Dojo post can no longer be seen on the list view.

In this example, the user has decided to check out the Hacker Dojo, and has now driven part way towards this destination. Here the user has driven about 5-6 miles on the roughly 9-10 mile trip towards the Hacker Dojo, and has stopped a few miles away to take a look at the local communication threads again.

Figure 16:
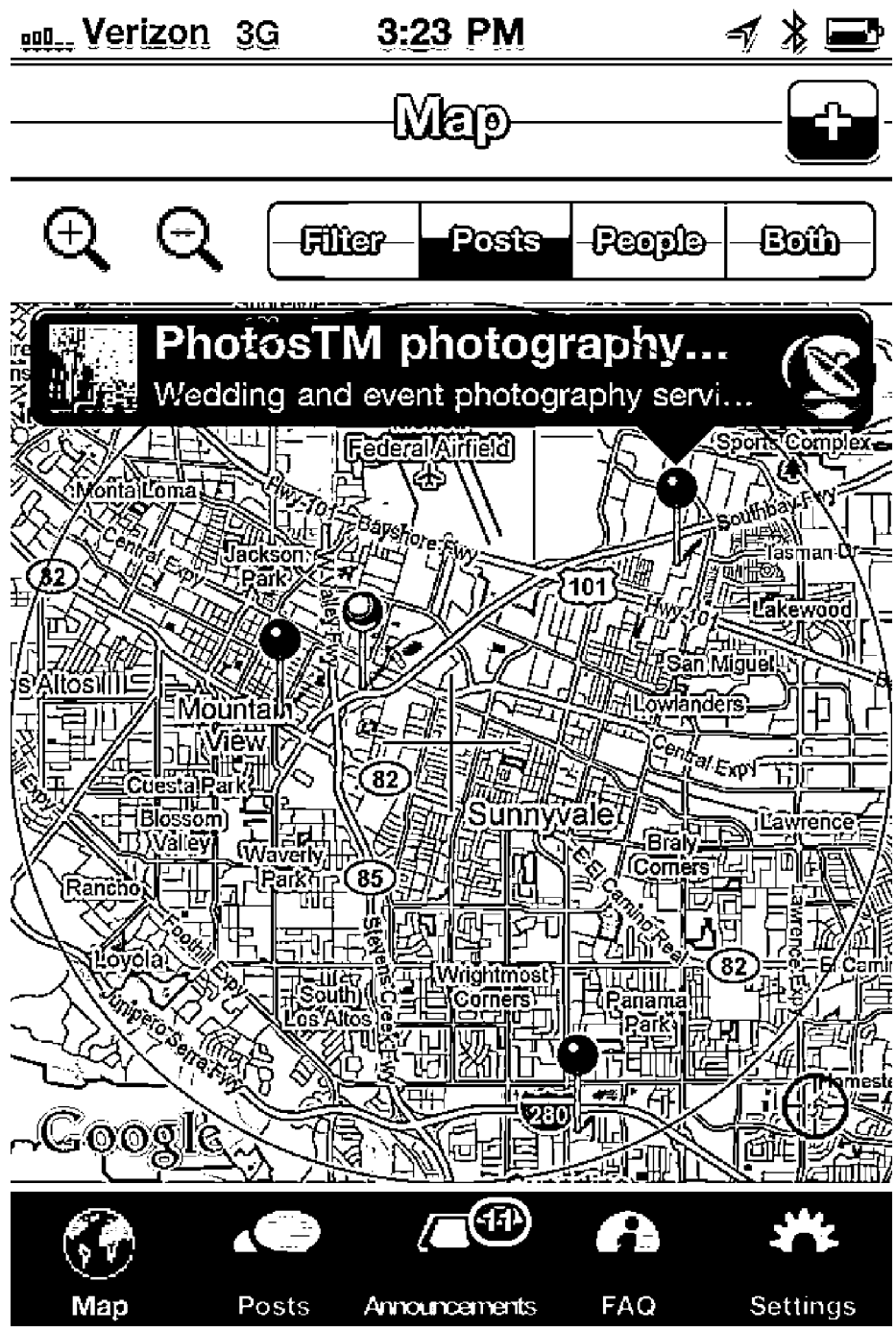
FIG. 16 shows what happens when the user drives closer to the point of interest, and the message reception radius is further reduced to 3.8 miles. By pressing on the various thread post pins, the user can find out more about the thread posts. Here one thread post is from a Photography service.

This is shown in FIG. 16. Here the user is closer to the Hacker Dojo point of interest, and has also reduced the first communication thread viewing geographical zone (message reception radius) to 3.8 miles. The system has been designed so that the user may take advantage of the iPhone's touch sensitive screen and get more information about a message thread geolocation of interest by pressing on a post pin corresponding to that particular thread on a map view. Here the user is querying various local message threads, here by pressing on the threads on a touch sensitive display, which brings up the tread title or icon, and the thread title. The post in FIG. 16 shows that this particular thread is from a photography service.

Figure 17:
FIG. 17 shows that another post is for the Hacker Dojo thread post and location of interest.

FIG. 17 shows that another post is for the Hacker Dojo post and location of interest.

Figure 18:
FIG. 18 shows the lists of thread posts from the user's present location, showing the various posts that can be seen within a 3.8 mile radius.

FIG. 18 shows the lists of posts from the user's present location, showing the various posts that can be seen within a 3.8 mile radius. Note how the Hacker Dojo thread, the photography service thread, and other threads previously seen in the map view are also shown on the list view.

Figure 19:
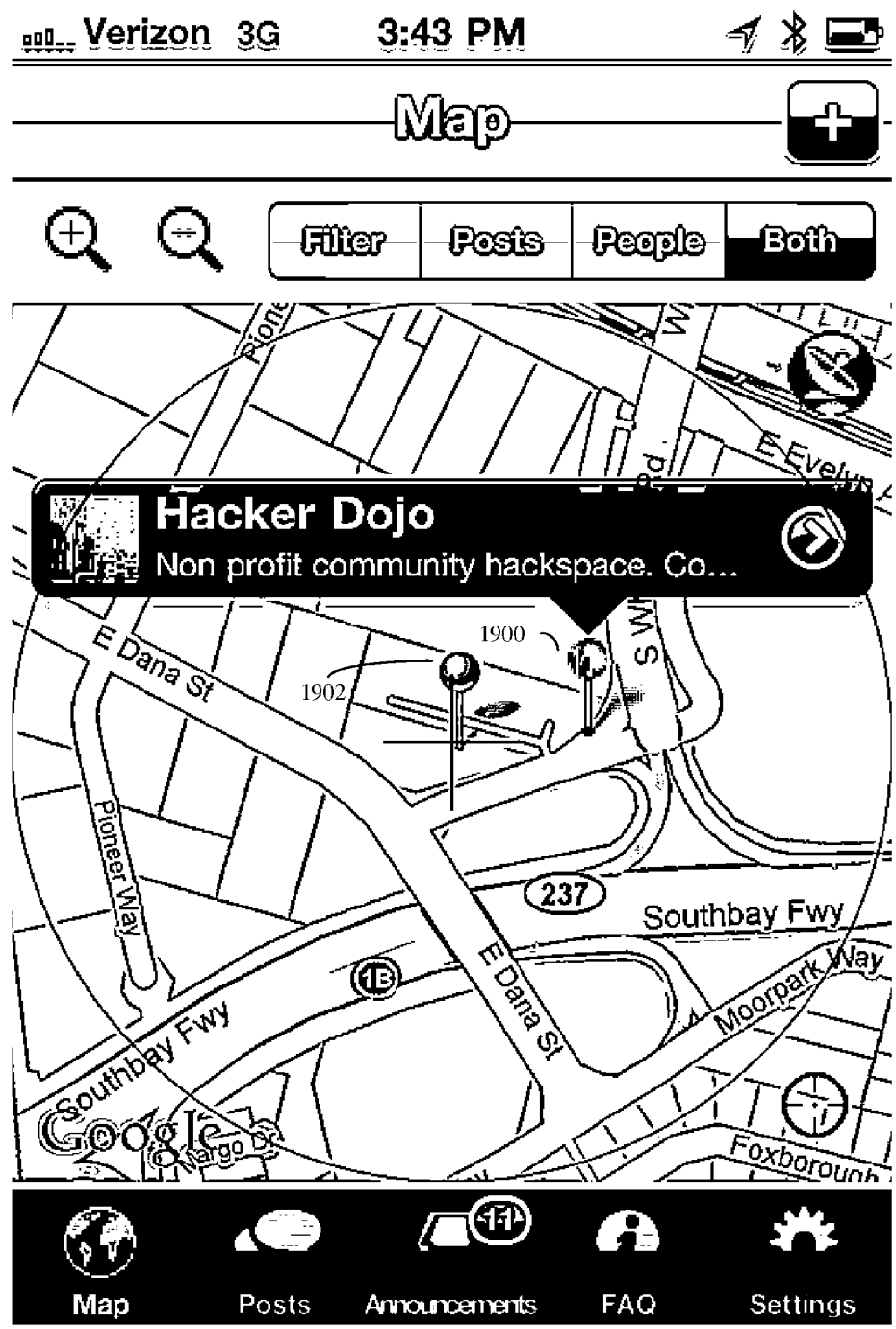
In FIG. 19, the user has almost reached the Hacker Dojo thread post of interest.

In FIG. 19, the user has almost reached the Hacker Dojo point of interest. The user may now zoom in very closely to the street where the Hacker Dojo building is. In this Figure, the user has set the AskLocal software to show both the Hacker Dojo post (1900), and the user's present location (1902) (even though the user has not yet posted), and thus two pins are shown on the map view. At this point, the user is well within the 1.4 mile reply radius (second reply geographical zone) set by the initiator or owner of the Hacker Dojo message thread.

Figure 20:
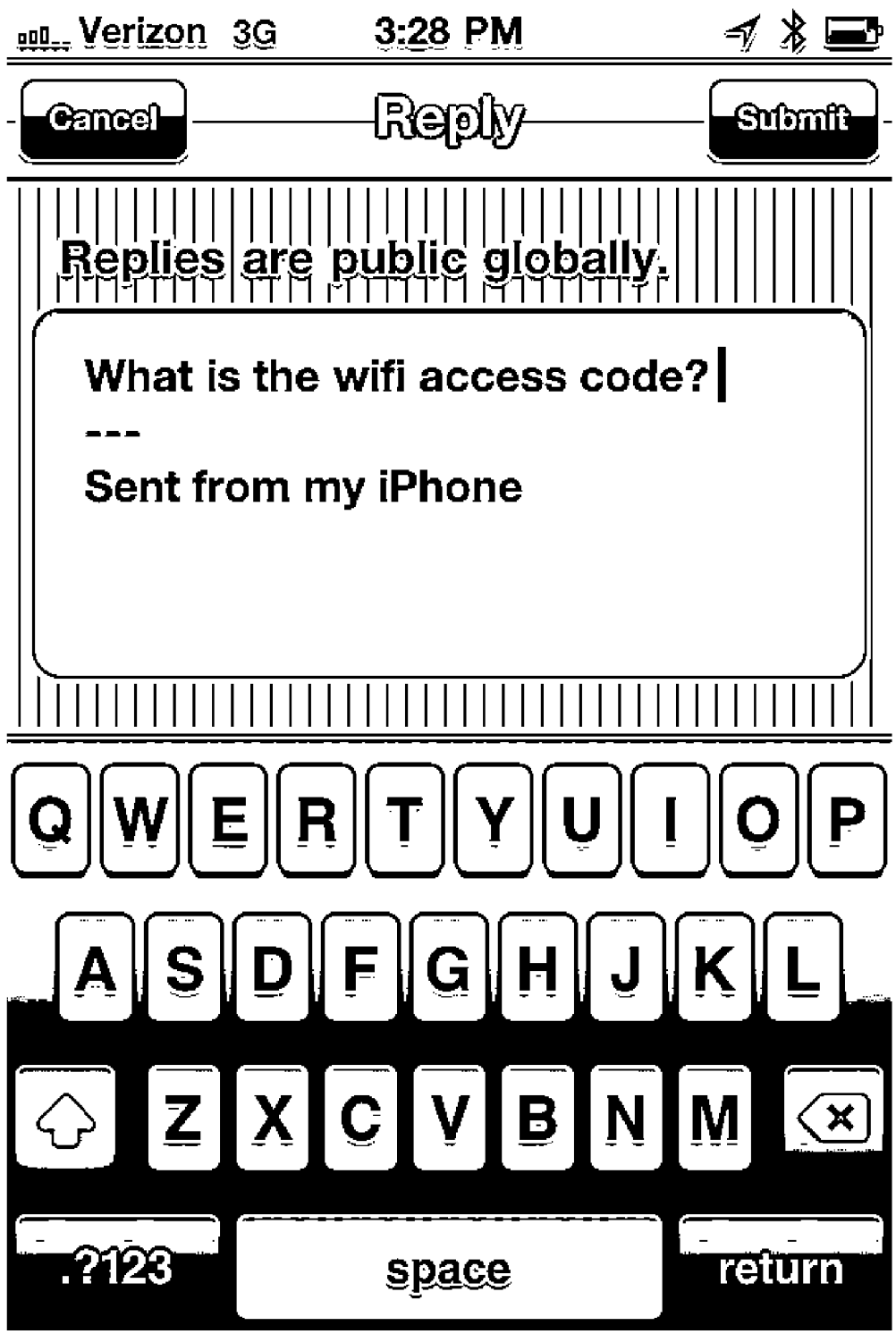
In FIG. 20, the user replies to the Hacker Dojo thread by replying with a question for the local Hacker Dojo members, here asking for the Wi-Fi access code so that he can get wireless access once he reaches the Hacker Dojo location. This reply is only visible from within the context of the main Hacker Dojo post. It is otherwise not independently visible.

In FIG. 20, the user uses the AskLocal software and iPhone to add another entry to the Hacker Dojo thread. In this case, the user, perhaps wanting to get access to a Wi-Fi network, asks posts and advance question requesting access to the local Hacker Dojo Wi-Fi access code, hoping perhaps to get an answer by the time the user actually reaches the Hacker Dojo location.

Figure 21:
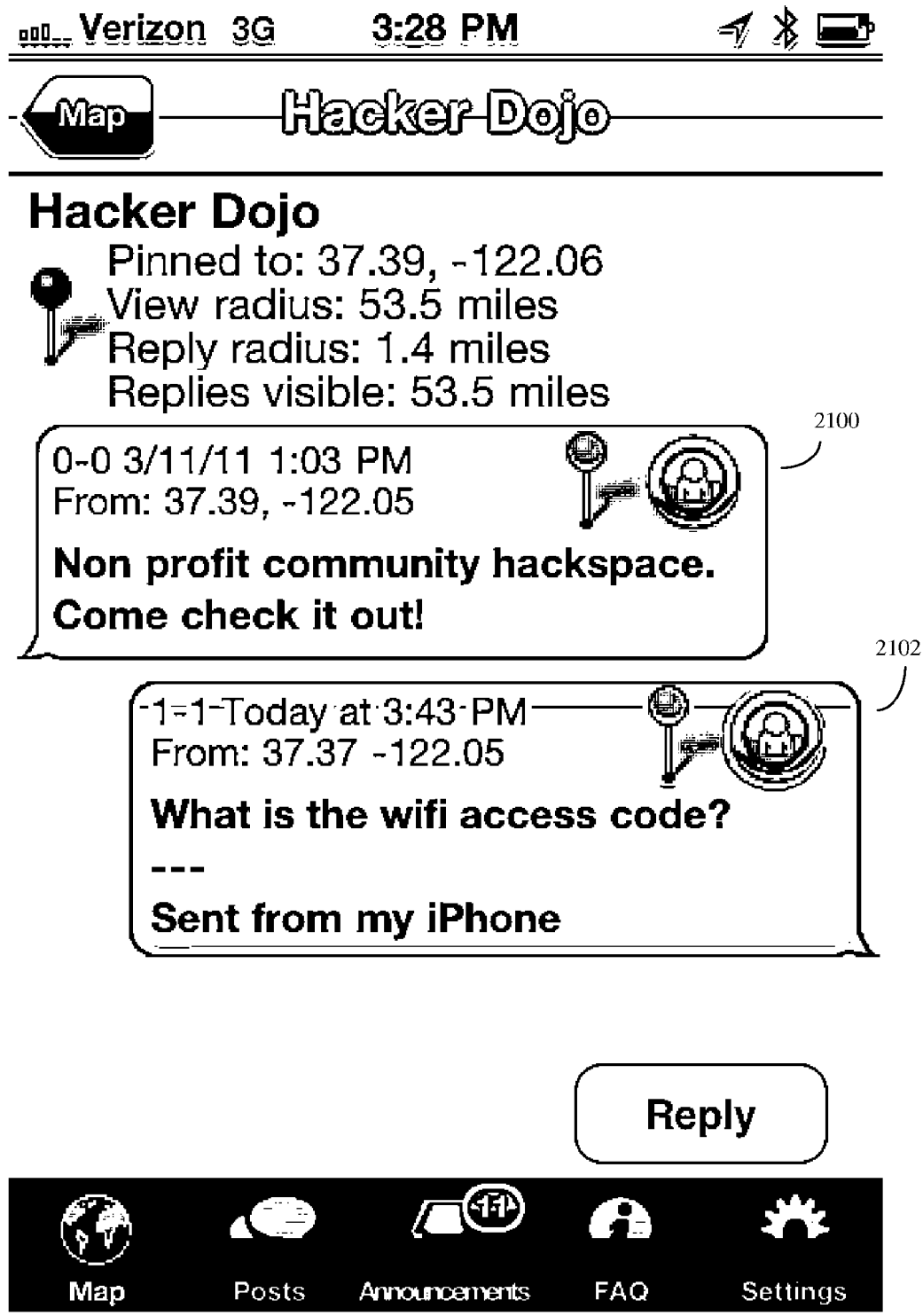
In FIG. 21, the result of the user's question is shown as a new entry on the original Hacker Dojo thread post seen previously.

In FIG. 21, the result of the user's question is shown as a reply to the original Hacker Dojo post seen previously. Here the true thread nature of the Hacker Dojo thread can be seen. Unlike prior art geotagging methods, here a message thread, capable of adding new messages, has been pinned or geolocated to the Hacker Dojo site. Thus both the original posting (2100) and the reply (2102) can be seen, and other users may also reply to this posting on this thread as well.

Figure 22:
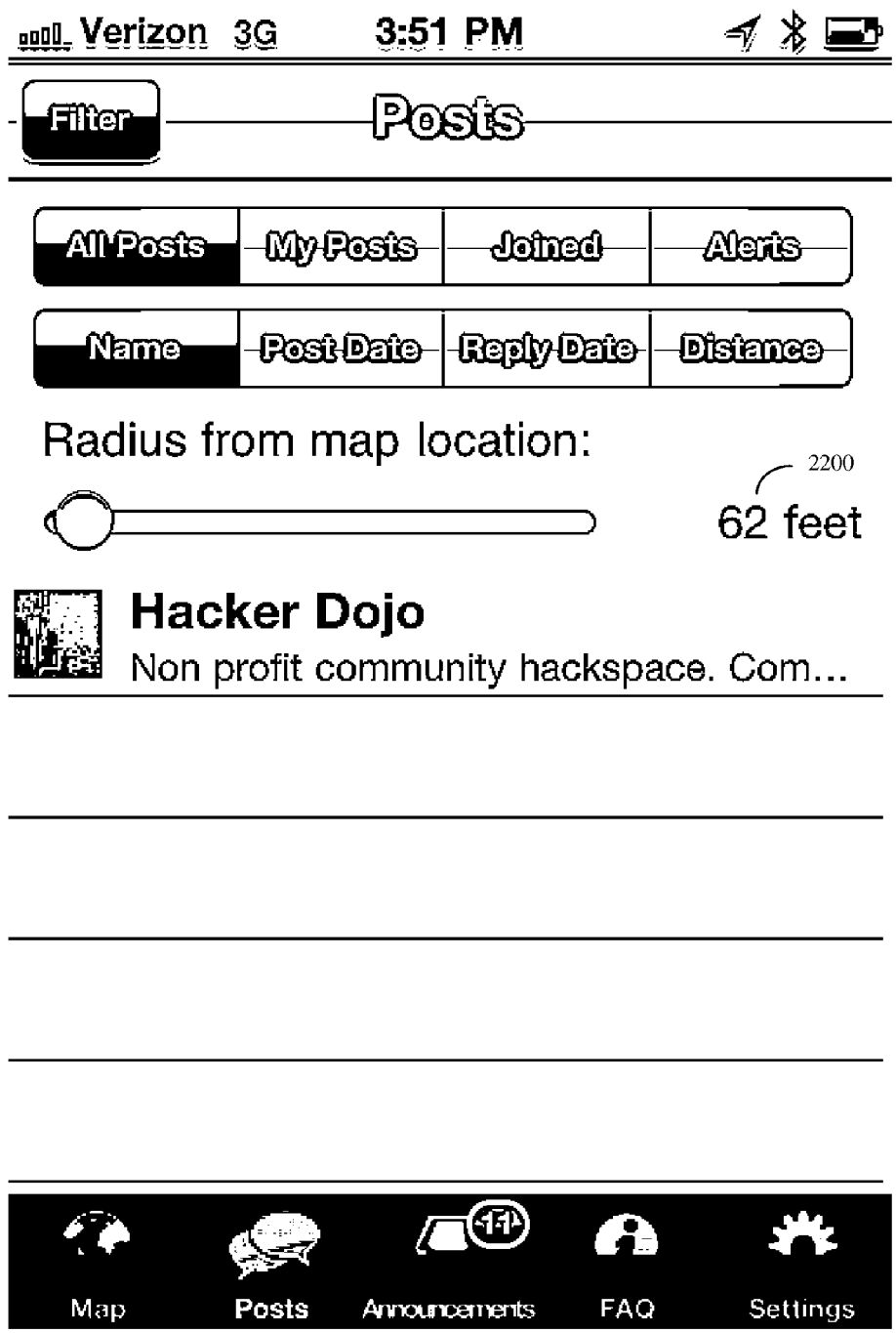
In FIG. 22, the user has essentially at the front door of the Hacker Dojo thread post and location. Thus when the user reduces the message radius to only 62 feet, the Hacker Dojo thread post can still be seen.

In FIG. 22, the user has essentially at the front door of the Hacker Dojo post and location. Thus when the user reduces the message radius (e.g. the first communication thread viewing geographical zone) to only 62 feet, the Hacker Dojo post can still be seen.

Figure 23:
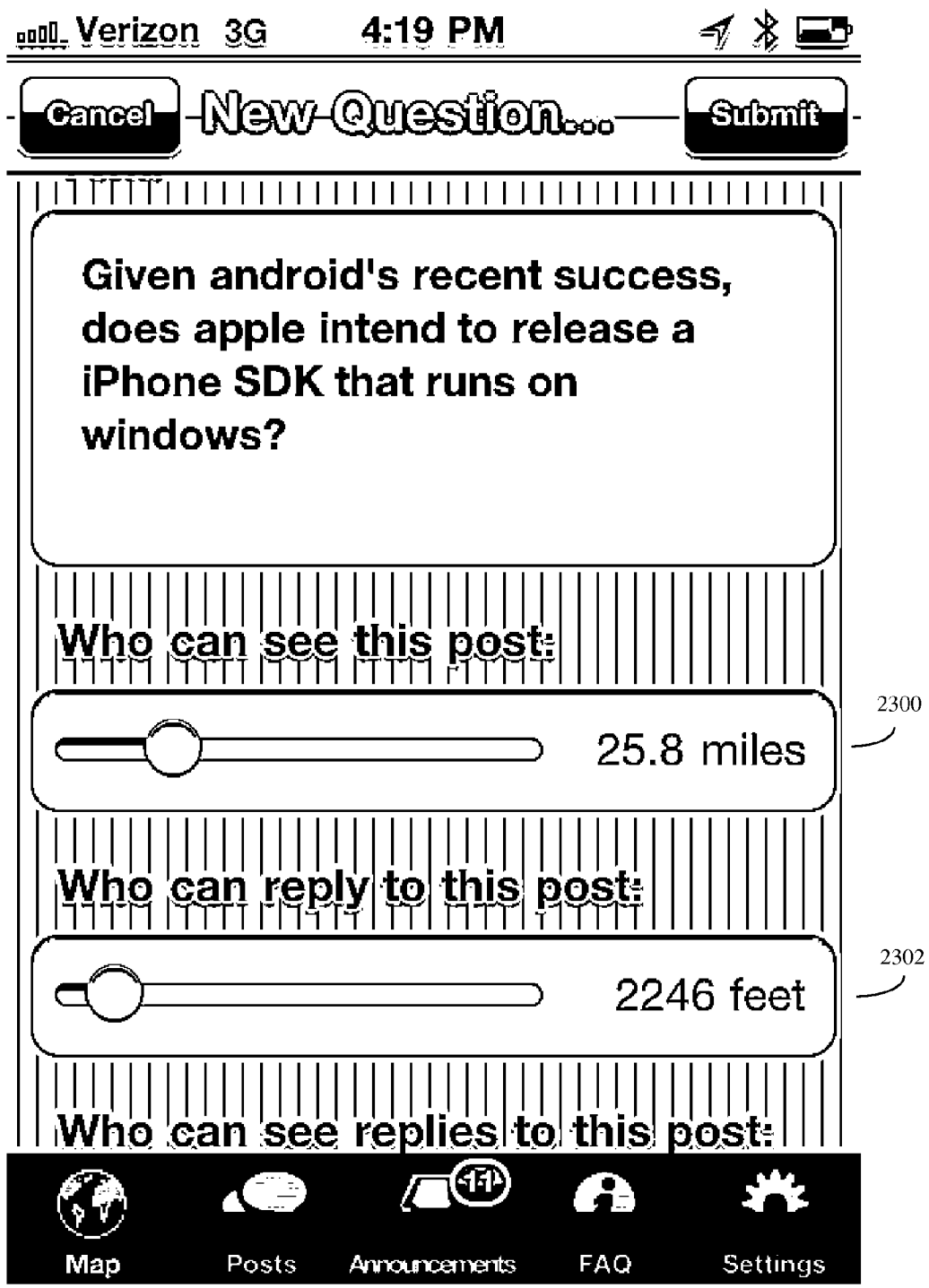
In FIG. 23, the user wishes to create a new thread in the question category. The user wishes this thread to be seen fairly broadly throughout the user's present Silicon Valley location, including the Apple Corporation Headquarters located within about 10 miles of the thread geolocation, but which can only be replied to by individuals who are near the location of the Hacker Dojo building and original Hacker Dojo thread post.

In FIG. 23, to demonstrate the process needed to create an entirely new communication's thread, the user decides so create a post with a first communication thread viewing geographical zone with a radius of 25.8 miles (2300) from the Hacker's current location, which is a few feet away from the entrance to the Hacker Dojo. Here the user, knowing that Apple Corporation Headquarters is only a few miles away, creates a new communication thread where members of Hacker Dojo, or at least people posting near Hacker Dojo, can urge Apple to create an iPhone Software Development Kit (SDK) that would run on the poplar windows operating system. To restrict the reply zone, the user has set the second communication thread reply geographical zone (reply zone) to a radius of about half a mile (2246 feet) (2302) from his present Hacker Dojo location.

Figure 24:
FIG. 24 shows the user's new question thread showing up on a map right next to the Hacker Dojo entrance. Here the user has also switched from map view to satellite, view, which is shown in high enough magnification that the Hacker Dojo building, parking lot, street, cars, and trees can clearly be seen. The user's new thread post now shows up in a location that is geographically very close to the original Hacker Dojo thread post.

In FIG. 24, the result of this posting can be seen. Where before there was only one communication thread pin (2400) outside of Hacker Dojo, now there are two (2400), (2402). In this Figure, the user has used the AskLocal software to switch to a photographic map display. As a result, the user's mobile device now shows a highly magnified satellite photograph of the roof of the Hacker Dojo, a nearby parking lot, the road (with a visible "Yield" sign, trees, and two pins that represent the geolocated threads (2400, 2402). Pressing the first pin (2400) reveals that this message thread is the original Hacker Dojo thread seen earlier.

Figure 25:
FIG. 25 shows the user's new thread post showing up on the map.

In FIG. 25, pressing the second pin (2402) reveals the heading of the user's new communication thread post.

Figure 26:
FIG. 26 shows a map view of the same location, again showing the new user thread post.

In FIG. 26, the user has switched away from satellite photographic view back to map view to show the push pins corresponding to the two message threads (2400), (2402) more clearly. Note that the curve of the road matches the photograph of the road previously seen in FIGS. 24 and 25.

Figure 27:
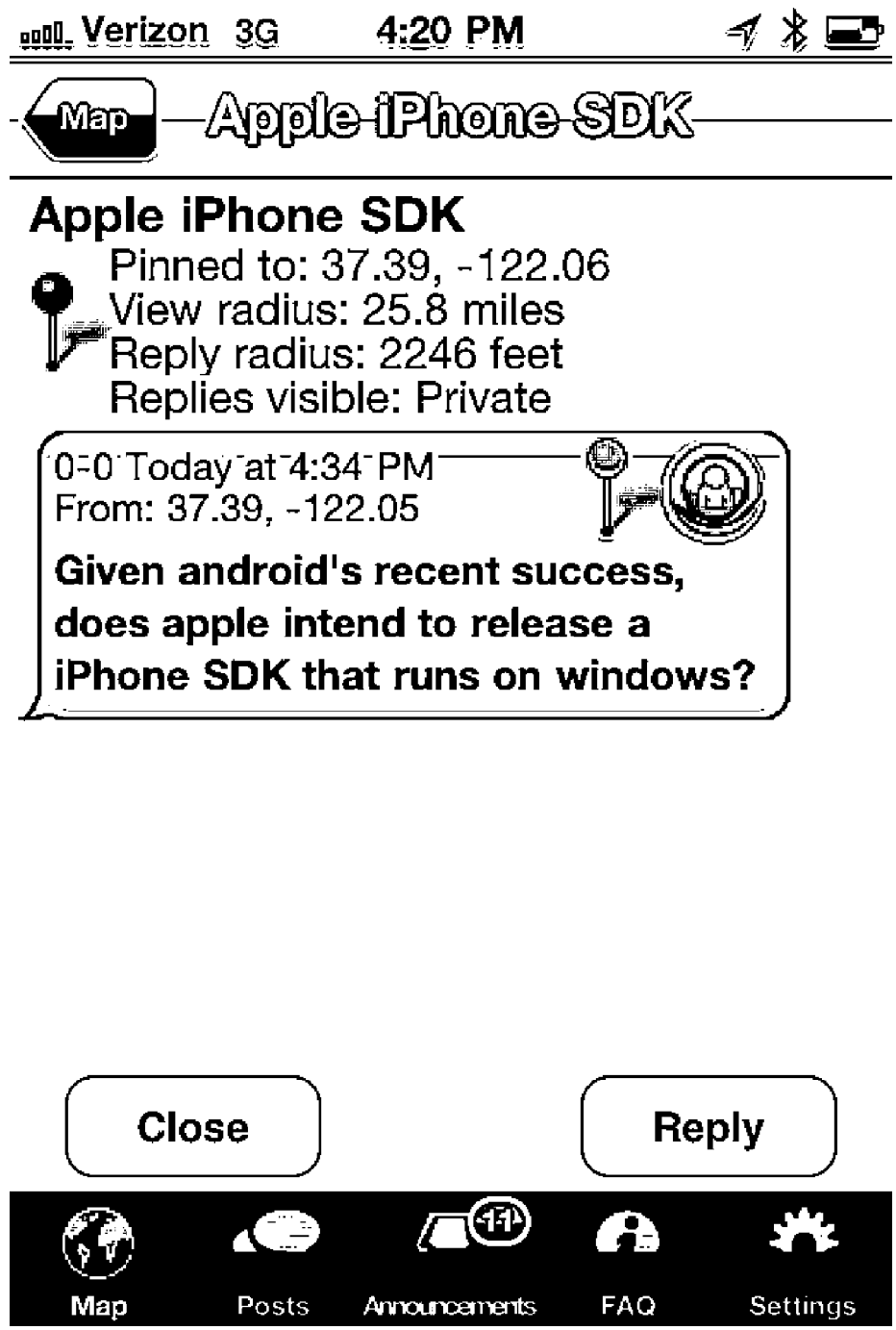
FIG. 27 shows what the user's new thread post looks like to other AskLocal users.

FIG. 27 shows what the user's new thread post looks like to other AskLocal users.

The invention claimed is:

1. A public communication by location method comprising: obtaining at least one mobile device equipped with at least one processor, memory, user interface, display screen, bidirectional wireless communication link capability, and location determination capability; said at least one processor to create at least one asynchronous communication thread on a database associated with a host internet server, each said communication thread comprising at least an initial entry, and at least one set of geographical identification metadata comprising at least the communication thread geolocation, a communication thread category, a first communication thread viewing geographical zone, and a second communication thread reply geographical zone; each said communications thread capable of supporting a geolocated asynchronous message thread; wherein said second reply geographical zone encompasses at least the geolocation of said communication thread, and said second reply geographical zone is encompassed within said first viewing geographical zone; setting a map viewing location on said mobile device, said map viewing location corresponding to the location where communication threads of interest may be located, and further setting a maximum communication thread viewing radius about said map viewing location; said at least one processor on said mobile device to establish a communications link with said host internet server, transmitting the present location and map viewing location of said mobile device to said host internet server, and transmitting at least a maximum communication thread viewing radius and one or more communication thread categories to said host internet server; host server software at said host internet server to use the present location and map viewing location of said mobile device, communication thread categories, and said maximum communication thread viewing radius as a search key to said database, searching for communication threads with communication thread geolocations, communication thread categories, and communication thread viewing zones that are within the maximum viewing radius of the map viewing location of said mobile device, and using the results of said search as at least a first search criteria to determine if at least the selected communication thread geolocations of the search selected communication threads should be transmitted to said mobile device; and said host internet server and said host server software to transmit at least the selected thread geolocations of said search selected communication threads to said mobile device.

2. The method of claim 1, further at least one processor on said at least one mobile device to establish a communication link with a map server, transmitting the map viewing location of said mobile device and said maximum communication thread viewing radius to said map server, and receiving selected map information pertaining to a geographical map within said maximum communication thread viewing radius to said mobile device; and displaying an overlay graphical image comprising least portions of said geographical map information and an overlay of said selected communication thread geolocations on the display screen of said mobile device, and at least one location circle showing said maximum communication thread viewing radius; and using said overlay graphical image to choose a search selected communication thread for further inquiry.

3. The method of claim 2, wherein said host server additionally transmits the category of said search selected communication threads to said mobile device; and said overlay graphical image of said search selected communication thread geolocations further shows a different graphical image according to the category of said search selected communication thread.

4. The method of claim 1, wherein said communication thread also comprises a communication thread heading, and/or thread icon.

5. The method of claim 4, wherein said host server additionally transmits the category, title, and/or icon of said search selected communication threads to said mobile device; and displaying a list on said mobile device, said list comprising at least the search selected communication thread geolocations, categories, title and/or icon, as well as the distance between said search selected communication thread geolocations and the map viewing location of said mobile device.

6. The method of claim 1, in which said host internet sever further returns at least portions of said search selected communication thread;

said at least portions being selected from said initial entry and any subsequent entries to said communication thread; and using said mobile device to view said at least portions of said selected communication thread.

7. The method of claim 6, wherein entries in said communication threads are further annotated by viewing privilege data;

ascertaining the viewing privileges of said mobile device; and using the viewing privileges of said mobile to device to determine which portions of said search selected communication thread are to be transmitted from said host server to said mobile device, and which portions are to be subsequently displayed by said mobile device.

8. The method of claim 7, wherein said privileges comprise one or more privileges selected from the group consisting of communications thread owner privilege, public privilege, previous poster privilege, group privilege, fee-based privilege, and other privileges.

9. The method of claim 6, in which said host internet server further returns information pertaining to said reply geographic zone of said selected communication thread to said mobile device; and if the present location of said mobile device is within said reply geographic zone of said selected communication thread, allowing a new subsequent message entry to said selected communication thread to be transmitted from said mobile device to said host internet server, linked or added to said selected communication thread, and stored on said database.

10. The method of claim 9, wherein said new subsequent entry comprises text, images, audio, video, URL links, binary program files, or other binary data.

11. The method of claim 1, further allowing a user of said mobile device, when creating a new communication thread, to adjust the new communication thread geolocation to a user selected geolocation that is either the same as or different from the present location of said mobile device.

12. The method of claim 1, further allowing a user of said mobile device, when creating a new communication thread, to designate a plurality of geolocations for said new communication thread, and to adjust the new communication thread geolocations to user selected geolocations that are either the same as or different from the present location of said mobile device.

13. The method of claim 1, wherein the first viewing geographical zone is circle or other regular polygon with a first radius, and said second reply geographical zone is a circle or other regular polygon with a second radius, the origin of both the first and second radius is at the communication thread geolocation, and the second radius has a length that is less than or equal to the first radius.

14. The method of claim 1, wherein the present location of said mobile device is determined using wireless signals from a plurality of Global Positioning Satellites.

15. A public communication by location method comprising:

obtaining at least one mobile device equipped with at least one processor, memory, user interface, display screen, bidirectional wireless communication link capability, and location determination capability; wherein the present location of said mobile device is determined using wireless signals from a plurality of Global Positioning Satellites; said at least one processor to create at least one asynchronous communication thread on a database associated with a host internet server, each said communication thread comprising at least an initial entry, and at least one set of geographical identification metadata comprising at least the communication thread geolocation, a communication thread category, a first communication thread viewing geographical zone, and a second communication thread reply geographical zone; each said communications thread capable of supporting a geolocated asynchronous message thread; wherein said second reply geographical zone encompasses at least the geolocation of said communication thread, and said second reply geographical zone is encompassed within said first viewing geographical zone; wherein the first viewing geographical zone is circle or other regular polygon with a first radius, and said second reply geographical zone is a circle or other regular polygon with a second radius, the origin of both the first and second radius is at the communication thread geolocation, and the second radius has a length that is less than or equal to the first radius; setting a map viewing location on said mobile device, said map viewing location corresponding to the location where communication threads of interest may be located, and further setting a maximum communication thread viewing radius about said map viewing location; said at least one processor on said mobile device to establish a communications link with said host internet server, transmitting the present location and map viewing location of said mobile device to said host internet server, and transmitting at least a maximum communication thread viewing radius and one or more communication thread categories to said host internet server; host server software at said host internet server to use the present location and map viewing location of said mobile device, communication thread categories, and said maximum communication thread viewing radius as a search key to said database, searching for communication threads with communication thread geolocations, communication thread categories, and communication thread viewing zones that are within the maximum viewing radius of the map viewing location of said mobile device, and using the results of said search as at least a first search criteria to determine if at least the selected communication thread geolocations of the search selected communication threads should be transmitted to said mobile device; said host internet server and said host sever software to transmit at least the selected thread geolocations of said search selected communication threads to said mobile device; wherein said communication threads represent messages transmitted between at least some users who are strangers with no social network social connection; further at least one processor on said at least one mobile device to establish a communication link with a map server, transmitting the map viewing location of said mobile device and said maximum communication thread viewing radius to said map server, and receiving selected map information pertaining to a geographical map within said maximum communication thread viewing radius to said mobile device; displaying an overlay graphical image comprising least portions of said geographical map information and an overlay of said selected communication thread geolocations on the display screen of said mobile device, and at least one location circle showing said maximum communication thread viewing radius; wherein said host server additionally transmits the category of said search selected communication threads to said mobile device; said overlay graphical image of said search selected communication thread geolocations further showing a different graphical image according to the category of said search selected communication thread; and said overlay graphical image to choose a search selected communication thread for further inquiry.

16. The method of claim 15, in which said host internet sever further returns at least portions of said search selected communication thread;
   said at least portions being selected from sad initial entry and any subsequent entries to said communication thread; and
   using said mobile device to view said at least portions of said selected communication thread.

17. The method of claim 16, in which said host internet server further returns information pertaining to said reply geographic zone of said selected communication thread to said mobile device; and
   if the present location of said mobile device is within said reply geographic zone of said selected communication thread, allowing a new subsequent message entry to said selected communication thread to be transmitted from said mobile device to said host internet server, linked or added to said selected communication thread, and stored on said database.

18. A public communication by location method comprising:
   obtaining at least one mobile device equipped with at least one processor, memory, user interface, display screen, bidirectional wireless communication link capability, and location determination capability; wherein the present location of said mobile device is determined using wireless signals from a plurality of Global Positioning Satellites; said at least one processor to create at least one asynchronous communication thread on a database associated with a host internet server, each said communication thread comprising at least an initial entry, and at least one set of geographical identification metadata comprising at least the communication thread geolocation, a communication thread category, a first communication thread viewing geographical zone, and a second communication thread reply geographical zone;
   each said communications thread supporting a geolocated asynchronous message thread; wherein said communication thread also comprises a communication thread heading, and/or thread icon; wherein said second reply geographical zone encompasses at least the geolocation of said communication thread, and said second reply geographical zone is encompassed within said first viewing geographical zone; wherein the first viewing geographical zone is circle or other regular polygon with a first radius, and said second reply geographical zone is a circle or other regular polygon with a second radius, the origin of both the first and second radius is at the communication thread geolocation, and the second radius has a length that is less than or equal to the first radius; setting a map viewing location on said mobile device, said map viewing location corresponding to the location where communication threads of interest may be located, and further setting a maximum communication thread viewing radius about said map viewing location; said at least one processor on said mobile device to establish a communications link with said host internet server, transmitting the present location and map viewing location of said mobile device to said host internet server, and transmitting at least a maximum communication thread viewing radius and one or more communication thread categories to said host internet server; host server software at said host internet server to use the present location and map viewing location of said mobile device, communication thread categories, and said maximum communication thread viewing radius as a search key to said database, searching for communication threads with communication thread geolocations, communication thread categories, and communication thread viewing zones that are within the maximum viewing radius of the map viewing location of said mobile device, and the results of said search as at least a first search criteria to determine if at least the selected communication thread geolocations of the search selected communication threads should be transmitted to said mobile device; said host internet server and said host server software to transmit at least the selected thread geolocations of said search selected communication threads to said mobile device; wherein said communication threads represent messages transmitted between at least some users who are strangers with no social network social connection; and using said overlay graphical image to choose a search selected communication thread for further inquiry; wherein said host server additionally transmits the category, title, and/or icon of said search selected communication threads to said mobile device; and displaying a list on said mobile device, said list comprising at least the search selected communication thread geolocations, categories, title and/or icon, as well as the distance between said search selected communication thread geolocations and the map viewing location of said mobile device.

19. The method of claim 18, in which said host internet sever further returns at least portions of said search selected communication thread;
   said at least portions being selected from sad initial entry and any subsequent entries to said communication thread; and
   using said mobile device to view said at least portions of said selected communication thread.

20. The method of claim 19, in which said host internet server further returns information pertaining to said reply geographic zone of said selected communication thread to said mobile device; and if the present location of said mobile device is within said reply geographic zone of said selected communication thread, allowing a new subsequent message entry to said selected communication thread to be transmitted from said mobile device to said host internet server, linked or added to said selected communication thread, and stored on said database.

\* \* \* \* \*